United States Patent
Li et al.

(10) Patent No.: US 11,464,006 B2
(45) Date of Patent: Oct. 4, 2022

(54) DATA TRANSMISSION METHOD, NETWORK DEVICE, AND TERMINAL

(71) Applicant: HUAWEI TECHNOLOGIES CO., LTD., Guangdong (CN)

(72) Inventors: You Li, Chengdu (CN); Xiaoyong Tang, Shenzhen (CN); Bo Fan, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 29 days.

(21) Appl. No.: 16/581,752

(22) Filed: Sep. 25, 2019

(65) Prior Publication Data

US 2020/0022125 A1    Jan. 16, 2020

Related U.S. Application Data

(63) Continuation of application No. PCT/CN2018/080551, filed on Mar. 26, 2018.

(30) Foreign Application Priority Data

Apr. 1, 2017    (CN) .......................... 201710214560.0

(51) Int. Cl.
*H04W 72/04*    (2009.01)
*H04W 28/02*    (2009.01)
(Continued)

(52) U.S. Cl.
CPC ..... *H04W 72/044* (2013.01); *H04W 28/0231* (2013.01); *H04W 28/16* (2013.01); *H04W 72/02* (2013.01); *H04W 72/08* (2013.01)

(58) Field of Classification Search
CPC .............................................. H04W 88/00–12
See application file for complete search history.

(56) References Cited

U.S. PATENT DOCUMENTS

2007/0298822 A1*   12/2007   Wan .................. H04L 1/1812
                                                                    455/509
2010/0220683 A1*    9/2010   Novak ................ H04L 1/1812
                                                                    370/336
(Continued)

FOREIGN PATENT DOCUMENTS

CN           101227698 A        7/2008
CN           101296212 A       10/2008
(Continued)

OTHER PUBLICATIONS

Nokia et al: "On MA resources for grant-free transmission", 3GPP Draft; R1-1609647,Oct. 9, 2016 (Oct. 9, 2016), XP051149682;total 4 pages.

*Primary Examiner* — San Htun
(74) *Attorney, Agent, or Firm* — Womble Bond Dickinson (US) LLP

(57) ABSTRACT

Embodiments of this application provide a data transmission method, a network device, and a terminal. When the method is performed by the terminal, the method includes: obtaining, a time-frequency resource used to transmit uplink data, where the time-frequency resource is at least one time-frequency resource block selected from a plurality of time-frequency resource blocks; each of the time-frequency resource blocks is corresponding to one piece of configuration information; and transmitting, the uplink data on the at least one selected time-frequency resource block based on configuration information of the at least one selected time-frequency resource block. The terminal may select a relatively narrow bandwidth to perform uplink transmission, to increase a transmit power of the terminal. In addition, the terminal performs the uplink transmission based on the corresponding configuration information, to further increase a transmit power. The network device perform demodula- (Continued)

tion, to improve demodulation efficiency and avoid generating a processing latency.

14 Claims, 5 Drawing Sheets

(51) Int. Cl.
  *H04W 28/16* (2009.01)
  *H04W 72/02* (2009.01)
  *H04W 72/08* (2009.01)

(56) References Cited

U.S. PATENT DOCUMENTS

| | | |
|---|---|---|
| 2011/0194528 A1 | 8/2011 | Dang et al. |
| 2011/0195704 A1 | 8/2011 | Choi et al. |
| 2012/0057476 A1* | 3/2012 | Chan ............... H04W 88/06 370/252 |
| 2013/0230013 A1* | 9/2013 | Seo ............... H04L 27/2602 370/329 |
| 2014/0254544 A1 | 9/2014 | Kar Kin Au et al. |
| 2015/0208394 A1* | 7/2015 | Seo ............... H04W 72/042 370/329 |
| 2017/0034845 A1* | 2/2017 | Liu ............... H04W 28/0289 |
| 2017/0257202 A1* | 9/2017 | Zhang ............... H04L 5/0048 |
| 2018/0092079 A1 | 3/2018 | Tang et al. |
| 2018/0191417 A1 | 7/2018 | Kim et al. |

FOREIGN PATENT DOCUMENTS

| | | |
|---|---|---|
| CN | 101345974 A | 1/2009 |
| CN | 104936133 A | 9/2015 |
| WO | 2016209055 A1 | 12/2016 |

* cited by examiner

R/F2/E/ LCID subheader

Pilot pattern with one subcarrier $l=0$ $l=6$ $l=0$ $l=6$

Pilot pattern with two subcarriers $l=0$ $l=6$ $l=0$ $l=6$

Pilot pattern with four subcarriers $l=0$ $l=6$ $l=0$ $l=6$

Pilot pattern with a granularity of a subcarrier

Pilot pattern with a granularity of an RB (12 subcarriers)

Pilot pattern with a granularity of an RBG (three RBs)

DATA TRANSMISSION METHOD, NETWORK DEVICE, AND TERMINAL

CROSS-REFERENCE TO RELATED APPLICATIONS

This application is a continuation of International Application No. PCT/CN2018/080551, filed on Mar. 26, 2018, which claims priority to Chinese Patent Application No. 201710214560.0 filed on Apr. 1, 2017. The disclosures of the aforementioned applications are hereby incorporated by reference in their entireties.

TECHNICAL FIELD

This application relates to the field of communications technologies, and in particular, to a data transmission method, a network device, and a terminal in the field of wireless communications.

BACKGROUND

A current communications system mainly supports voice communication and data communication. Usually, a conventional base station supports a limited quantity of connections. A next generation mobile communications system needs to support not only the conventional voice communication and data communication, but also machine-to-machine (M2M) communication, or referred to as massive machine type communications (mMTC). It is predicated that a quantity of mMTC devices connected to a network is to reach 50 billion to 100 billion (including 50 billion and 100 billion) by year 2020, and far exceeds a current quantity of connections.

Because service types of mMTC services greatly differ, requirements for a network are very different. Generally, there may be the following two required services: One service is a latency-insensitive service that needs reliable transmission; and the other service is a service that needs low-latency and high-reliability transmission. The latency-insensitive service that needs reliable transmission is relatively easy to process. However, for the service that needs low-latency and high-reliability transmission, if transmission is unreliable, retransmission may be caused, and consequently, a transmission latency is excessively large. Therefore, a requirement cannot be met.

To meet a requirement of a large quantity of mMTC services in a future network and a requirement of low-latency and high-reliability service transmission, an uplink grant-free transmission solution is applied to this type of services. In a grant-free transmission system, there are a large quantity of terminals, but there are a very small quantity of terminals that access a network. A terminal may randomly select a grant-free transmission resource to send data.

In a grant-free transmission mechanism, a base station needs to perform, on the grant-free transmission resource, blind detection on uplink data sent by the terminal. Demodulation complexity is very high. How to reduce demodulation complexity is a technical problem that urgently needs to be resolved.

SUMMARY

Embodiments of this application provide a data transmission method, a network device, and a terminal.

This application provides a data transmission method, where the method includes:

First, an uplink transmission time-frequency resource is divided into a plurality of time-frequency resource blocks, and corresponding configuration information is configured for each time-frequency resource block.

In an implementation, a network device divides the uplink transmission time-frequency resource into the plurality of time-frequency resource blocks, and stores the uplink transmission time-frequency resource divided into the plurality of time-frequency resource blocks.

In another implementation, a device development or maintenance person configures, for the network device, a table or parameter information indicating division of the uplink transmission time-frequency resource into the plurality of time-frequency resource blocks.

In addition, the uplink transmission time-frequency resource is divided into the plurality of time-frequency resource blocks in the following two manners: In one manner, the uplink transmission time-frequency resource is associated with a terminal group, the uplink transmission time-frequency resource is first divided based on a terminal group, and then an uplink transmission time-frequency resource specific to each terminal group is further divided into different time-frequency resource blocks. In the other manner, terminal groups are not distinguished, the uplink transmission time-frequency resource is directly divided into different time-frequency resource blocks. The configuration information is associated with each time-frequency resource block. When the terminal selects a time-frequency resource block, or selects a time-frequency resource block corresponding to a terminal group to which the terminal belongs, the terminal may use an uplink transmission configuration corresponding to the time-frequency resource block.

The uplink transmission time-frequency resource herein is a time-frequency resource that is reserved by the network device for the terminal and that is used for uplink grant-free transmission, or a contention transmission unit (CTU) used for uplink grant-free transmission. As required, the uplink transmission time-frequency resource can be configured within a range of a time-frequency resource used by a group of terminals to perform uplink grant-free transmission, or a time-frequency resource of an entire bandwidth. In the foregoing two manners, sizes of time-frequency resource blocks may be different, or may be the same. Specifically, the time-frequency resource blocks are distinguished by using sub-bands in a dimension of frequency domain. Each of the plurality of time-frequency resource blocks occupies a same bandwidth, or at least two of the plurality of time-frequency resource blocks occupy different bandwidths. A quantity of subcarriers included in each sub-band may be the same or different. The time-frequency resource blocks are distinguished by using a subframe, a slot, or a mini-slot in a dimension of time domain. A quantity of symbols occupied by each of the time-frequency resource blocks in time domain is the same, or quantities of symbols occupied by at least two time-frequency resource blocks in time domain are different. The time-frequency resource may be flexibly divided as required. The terminal may flexibly select, based on a transmission requirement, a size of a time-frequency resource block suitable for current transmission. In an implementation, each time-frequency resource block is a sub-band.

In a manner, the configuration information includes identification information of a configured time-frequency resource block in the uplink transmission time-frequency resource, and the identification information is a start position or an index number of a corresponding time-frequency resource block.

The configuration information further includes a quantity of configured time-frequency resource blocks in the uplink transmission time-frequency resource.

The configuration information further includes an upper limit of a quantity of available time-frequency resource blocks in the uplink transmission time-frequency resource.

The configuration information further includes lengths and end positions of time-frequency resource blocks in the uplink transmission time-frequency resource.

The configuration information is explicitly indicated by using signaling, or implicitly indicated by using a pilot pattern, or indicated by using a pilot sequence.

After the configuration information is configured for each time-frequency resource block, the network device sends the plurality of time-frequency resource blocks and corresponding configuration information to the terminal. In an implementation, when the terminal needs to send an uplink signal, the network device sends configuration information to the terminal.

The terminal receives the plurality of time-frequency resource blocks and corresponding configuration information sent by the network device to the terminal, and locally stores the plurality of time-frequency resource blocks and the corresponding configuration information for use in uplink transmission.

When the terminal needs to send uplink data, the terminal selects, for uplink transmission, one or more time-frequency resource blocks from the plurality of time-frequency resource blocks. In the configuration information, a time-frequency resource block parameter for performing uplink transmission by the terminal, and a parameter required for coverage enhancement are included. The time-frequency resource block parameter includes at least identification information of a time-frequency resource block. The identification information may be a start position of the resource block or may be an index number of the resource block. In addition, the time-frequency resource block parameter further includes a length of the time-frequency resource block or an end position of the time-frequency resource block, a granularity of the time-frequency resource block, and the like. The parameter required for coverage enhancement includes parameter information such as a power control parameter, a transmission time interval (TTI) bundling size indication, or a repetition size indication. Finally, when sending the uplink data, the terminal transmits the uplink data on the at least one selected time-frequency resource block based on configuration information of the at least one selected time-frequency resource block.

In an optional implementation, when sending the uplink data, the terminal may further notify the network device of identification information of the time-frequency resource block selected by the terminal. The identification information of the time-frequency resource block may be sent together with the uplink data, or may be independently sent (in other words, the identification information of the time-frequency resource block is sent without the uplink data).

Specifically, when the configuration information of the time-frequency resource block includes a start position or an index number, the terminal sends the uplink data on a time-frequency resource block indicated by the start position or the index number of the time-frequency resource block. When the configuration information of the time-frequency resource block further includes the start position and a length, the terminal sends, by using the start position of the time-frequency resource block as a start point, the uplink data on a time-frequency resource block corresponding to the length. When the configuration information of the time-frequency resource block includes the start position and the end position, the terminal sends the uplink data on a time-frequency resource block whose start point is the start position of the time-frequency resource block and whose end point is the end position of the time-frequency resource block. When the configuration information of the time-frequency resource block includes the start position and a granularity, the terminal sends, by using the start position of the time-frequency resource block as a start point, the uplink data on a time-frequency resource block represented by a time-frequency resource width used as a granularity. When the configuration information of the time-frequency resource block includes the start position and a power control parameter, the terminal sends, by using the start position of the time-frequency resource block as a start point, the uplink data on a time-frequency resource block corresponding to a power indicated by using the power control parameter. When the configuration information of the time-frequency resource block includes the start position and a TTI bundling size indication, the terminal sends, by using the start position of the time-frequency resource block as a start point, the uplink data in several bundled time units that has several time intervals indicated by using the TTI bundling size; or the terminal sends, by using the start position of the time-frequency resource block as a start point, the uplink data in several repeated transmission time units indicated by using the repetition size.

The network device can correctly demodulate, through blind detection, the uplink data received from the terminal. In comparison with the prior art, the identification information of the time-frequency resource block is indicated in the configuration information, and based on the identification information, the network device performs blind detection for a limited quantity of times within a limited range. In this case, the network device does not need to perform detection for a plurality of times to test various possibilities, thereby reducing complexity of blind detection.

In an implementation, the terminal may further add, to the uplink information, the identification information of the at least one time-frequency resource block selected by the terminal, to send the uplink information to the network device.

In another implementation, when the terminal sends, to the network device by using uplink control signaling, the identification of the at least one time-frequency resource block selected by the terminal, and uplink data is sent to the network device through a data channel.

In still another implementation, the network device determines a start position of the corresponding time-frequency resource block by detecting a sequence sent by the terminal, and detects, on the start position, that in all the three manners in which the terminal transmits the uplink data, the network device can perform correct demodulation, thereby further reducing complexity of demodulation.

During implementation of the data transmission method provided in this application, the uplink transmission time-frequency resource pre-allocated by the network device to the terminal is divided into the plurality of time-frequency resource blocks. Therefore, the terminal may select a time-frequency resource with a relatively narrow bandwidth to perform uplink transmission, thereby increasing a transmit power of the terminal. Further, the network device further configures the configuration information for each time-frequency resource block. The configuration information may carry a sub-band parameter or a coverage enhancement parameter, or both the sub-band parameter and the coverage enhancement parameter. Therefore, after selecting the time-frequency resource block used for the uplink transmission, the terminal performs the uplink transmission based on the corresponding configuration information, to further increase a transmit power. In addition, the network device may perform demodulation on a correct time-frequency resource block based on the configuration information, to improve demodulation efficiency and avoid generating a processing latency.

According to another aspect, an embodiment of this application provides a network device, where the network device may be a base station or a control node.

The network device includes:

a transceiver, configured to send, to a terminal, information about a time-frequency resource used to transmit uplink data, where the time-frequency resource includes a plurality of time-frequency resource blocks and the time-frequency resource blocks are divided into a plurality of sub-bands at least on a frequency domain resource; the information about the time-frequency resource includes each time-frequency resource block and configuration information corresponding to the time-frequency resource block; and the configuration information includes at least identification information of the corresponding time-frequency resource block; and a processor, configured to detect, on at least one time-frequency resource block selected by the terminal, the uplink data transmitted by the terminal.

According to still another aspect, an embodiment of this application provides a base station, where the base station has a function of implementing behavior of the base station in the foregoing method designs. The functions may be implemented by hardware, or may be implemented by hardware executing corresponding software. The hardware or the software includes at least one module corresponding to the foregoing function.

In a design, a structure of the base station includes a processor and a transceiver, where the processor is configured to support the base station in performing corresponding functions in the foregoing method. The transceiver is configured to: support communication between the base station and the terminal; send the information or signaling to the terminal in the method; and receive information or an instruction sent by the base station. The base station may further include a memory. The memory is coupled to the processor, and the memory stores a program instruction and data that are necessary to the base station.

According to yet another aspect, an embodiment of this application provides a control node, where the control node may include a controller/processor, a memory, and a communications unit. The controller/processor may be configured to coordinate resource management and configuration among a plurality of base stations, and may be configured to perform the method operations of configuring the time-frequency resource for the terminal described in the foregoing embodiment. The memory may be configured to store program code and data of the control node. The communications unit is configured to support the control node in communicating with a base station, for example, sending information about a configured resource to the base station.

According to still yet another aspect, an embodiment of this application provides a terminal, where the terminal has a function of implementing behavior of the terminal in the foregoing method designs. The function may be implemented by hardware. The terminal includes:

a processor, configured to obtain a time-frequency resource used to transmit uplink data, where the time-frequency resource is at least one time-frequency resource block selected from the plurality of time-frequency resource blocks; each of the plurality of time-frequency resource blocks is corresponding to one piece of configuration information; and the configuration information includes at least identification information of the corresponding time-frequency resource block; and a transceiver, configured to transmit the uplink data on the at least one selected time-frequency resource block based on configuration information of the at least one time-frequency resource block selected by the processor.

The terminal may further include a memory, and the memory is configured to store information about the time-frequency resource used to transmit the uplink data. The time-frequency resource includes a plurality of time-frequency resource blocks.

The memory may be integrated into the processor.

The terminal may be alternatively implemented by hardware executing corresponding software. The hardware or the software includes at least one module corresponding to the foregoing function. The module may be software and/or hardware.

According to a further aspect, an embodiment of this application further provides a processing apparatus, where the processing apparatus includes a processor and an interface.

The processor is configured to obtain a time-frequency resource used to transmit uplink data. The time-frequency resource includes a plurality of time-frequency resource blocks; the information about the time-frequency resource includes configuration information corresponding to each time-frequency resource block; and the configuration information includes at least identification information of the corresponding time-frequency resource block.

The processor is further configured to: when the uplink data needs to be sent, select at least one time-frequency resource block from the plurality of time-frequency resource blocks, and provide the at least one selected time-frequency resource block for a transceiver through the interface, so that the transceiver transmits the uplink data on the at least one selected time-frequency resource block.

The processing apparatus may be a chip. The processor may be implemented by using hardware or software. When implemented by using the hardware, the processor may be a logic circuit, an integrated circuit, or the like. When implemented by using the software, the processor may be a general-purpose processor, and is implemented by reading software code stored in a memory. The memory may be integrated into the processor, or may be located outside the processor and exist independently.

According to a still further aspect, an embodiment of this application provides a communications system, where the system includes the base station and the terminal in the foregoing aspects. Optionally, the system may further include the control node in the foregoing embodiment.

According to a yet further aspect, an embodiment of this application provides computer storage medium, where the computer storage medium is configured to store computer software instruction used by the foregoing base station, and the computer software instruction includes a program used to perform the foregoing aspects.

According to a still yet further aspect, an embodiment of this application provides computer storage medium, where the computer storage medium is configured to store computer software instruction used by the foregoing terminal, and the computer software instruction includes a program used to perform the foregoing aspects.

During implementation of the network device and the terminal provided in this application, the uplink transmission time-frequency resource pre-allocated by the network device to the terminal is divided into the plurality of sub-bands. Therefore, the terminal may select a time-frequency resource with a relatively narrow bandwidth to perform uplink transmission, thereby increasing a transmit power of the terminal. Further, the network device further configures the configuration information for each sub-band. The configuration information may carry a sub-band parameter or a coverage enhancement parameter, or both the sub-band parameter and the coverage enhancement parameter. Therefore, after selecting the sub-band used for the uplink transmission, the terminal performs the uplink transmission based on the corresponding configuration information, to further increase a transmit power. In addition, the network device may perform demodulation on a correct time-frequency resource block based on the configuration information, to improve demodulation efficiency and avoid generating a processing latency.

BRIEF DESCRIPTION OF DRAWINGS

To describe the technical solutions in the embodiments of this application more clearly, the following briefly describes the accompanying drawings required for the embodiments. Apparently, the accompanying drawings in the following description show merely some embodiments of this application, and a person of ordinary skill in the art may still derive other drawings from these accompanying drawings without creative efforts.

FIG. 1 is a schematic diagram of indicating a start position of an uplink transmission sub-band by using a pilot pattern according to an embodiment of this application;

DESCRIPTION OF EMBODIMENTS

Figure 1:
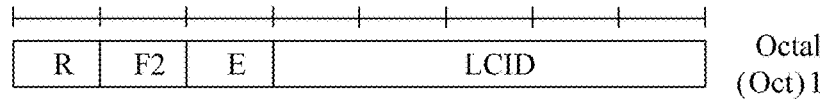
FIG. 1 is a schematic diagram of a MAC subheader according to an embodiment of this application.

In a communications system, to ensure correct data transmission or communication quality, at least one of the following two manners is generally used:

(1) a transmission time interval (TTI) bundling manner, where a terminal transmits same signals on several consecutive subframes, and a network device combines the signals transmitted on the several subframes, thereby improving signal demodulation quality; and (2) a manner of increasing a single-time power of sending a signal by the terminal.

Currently, in a grant-based transmission mechanism of a long term evolution (LTE) system, to ensure correct data transmission, a base station may adjust, in real time, a time-frequency resource for performing uplink transmission by each terminal. An example is as follows:

When the terminal needs to send uplink data, the terminal sends an uplink resource scheduling request to the base station. To improve communication quality, the base station may configure a plurality of subframes or slots (slot) for the terminal, so that the terminal performs TTI bundling. Alternatively, the base station reduces a transmission bandwidth of the terminal in frequency domain, to increase a transmit power of the terminal in a single time-frequency resource block (RB). Alternatively, the base station uses a combination of the foregoing two manners for the terminal.

Correspondingly, the terminal sends uplink data based on scheduling performed by the base station, and the base station demodulates the data at a time-frequency position specified in scheduling information.

A new communication requirement poses various challenges to an existing network in terms of technologies and commercial modes, and needs to be met by a next generation mobile network (NGMN). In the NGMN, mobile network services are mainly classified into three types of scenarios: enhanced mobile broadband (eMBB), ultra-reliable and low-latency communications (URLLC), and massive machine type communications (mMTC).

For a scenario with a high connection density requirement, such as a smart city or smart agriculture, mMTC coverage meets a digital society requirement of people. A typical characteristic of the scenario is massive connectivity. In other words, there is a large quantity of terminals. Service types are mainly a small packet service, and there is a specific requirement for a low latency.

URLLC focuses on a service that is very sensitive to a latency, such as automatic driving or assisted driving. For services such as Internet of Vehicles, unmanned driving, and industrial control, a system capacity is not a major concern, but there is a high requirement for a latency and reliability.

In the foregoing two scenarios, grant-free transmission is considered as a better and more suitable uplink data transmission method than grant-based transmission. In comparison with a grant-based transmission solution in which the base station performs scheduling, in the grant-free transmission, a transmission latency is greatly shortened because a process of sending an uplink scheduling request and waiting to receive a grant from the base station is not required, thereby meeting a latency requirement.

However, The prior art has the following disadvantages: in the grant-free transmission mechanism, a resource of transmitting data by the terminal is reserved in advance, and the reserved resource is usually specific to a plurality of terminals in some scenarios. To resolve a problem of coverage, if the base station adjusts a reserved resource in real time based on a change of a coverage requirement of the terminal, a relatively great quantity of signaling overheads and a relatively long transmission latency are caused.

In addition, if the terminal independently adjusts a transmission resource and a corresponding sending parameter, the base station does not know, in advance, a time-frequency position at which the terminal transmits data, and needs to perform detection for a plurality of times to test various possibilities. Consequently, demodulation complexity and a processing latency are increased.

In view of this, to resolve a technical problem of enhancing coverage in the grant-free transmission mechanism during transmission of massive URLLC and mMTC services and transmission of massive low-latency and high-reliability services in a future network, embodiments of this application provide a technical solution: An uplink transmission time-frequency resource configured for the terminal is divided into a plurality of time-frequency resource blocks, and therefore, the terminal may select a time-frequency resource with a relatively narrow bandwidth to perform uplink transmission, thereby increasing a transmit power of the terminal. Further, the network device configures corresponding configuration information for each time-frequency resource sub-block. The configuration information may carry a time-frequency resource block parameter or a coverage enhancement parameter, or both two parameters. Therefore, after selecting a time-frequency resource block for uplink transmission, the terminal performs the uplink transmission based on the corresponding configuration information, to further increase a transmit power. In addition, the network device may further perform demodulation on a correct time-frequency resource block based on the configuration information, to improve demodulation efficiency and avoid generating a processing latency.

It should be understood that to ensure reliability of grant-free transmission in the foregoing URLLC and mMTC scenarios, the embodiments of this application provide an uplink transmission technology. Certainly, application of the technical solutions provided in this application is not limited only to URLLC and mMTC scenarios, and the data transmission method, the terminal, and the network device provided in this application may all apply to any other grant-free transmission scenario that does not require scheduling performed by the base station.

It should be further understood that the grant-free transmission in the embodiments of this application may be denoted as grant free transmission in English, and an abbreviation is GF transmission. However, the grant-free transmission may be also expressed in another form, for example, grantless transmission or contention based transmission. A meaning of the grant-free transmission is not limited in this specification. It may be understood that the grant-free transmission herein is not a proper noun and may have other names in actual application, but none of the names departs from the essence of this patent application. The grant-free transmission is usually performed for uplink data transmission, and may be understood as any one or more of the following meanings, but is not limited to the meanings. For example, the grant-free transmission may be also understood as a combination of some technical features in the following plurality of meanings or another similar meaning.

The grant-free transmission may mean that a network device pre-allocates a plurality of transmission resources and notifies a terminal of the plurality of transmission resources; when the terminal needs to transmit uplink data, the terminal selects at least one transmission resource from the plurality of transmission resources pre-allocated by the network device, and sends the uplink data by using the selected transmission resource; and the network device detects, on the at least one of the plurality of pre-allocated transmission resources, the uplink data transmitted by the terminal. The detection may be blind detection, detection performed based on a specific control field in the uplink data, or detection performed in another manner.

The grant-free transmission may mean that a network device pre-allocates a plurality of transmission resources and notifies a terminal of the plurality of transmission resources, so that when the terminal needs to transmit uplink data, the terminal selects at least one transmission resource from the plurality of transmission resources pre-allocated by the network device, and sends the uplink data by using the selected transmission resource.

The grant-free transmission may mean that information about a plurality of pre-allocated transmission resources is obtained; and when uplink data needs to be transmitted, at least one transmission resource is selected from the plurality of transmission resources, and the uplink data is sent by using the selected transmission resource. In an obtaining manner, the information about the plurality of pre-allocated transmission resources may be obtained from a network device.

The grant-free transmission may refer to a method for implementing uplink data transmission performed by a terminal without a requirement of dynamic scheduling performed by a network device, and the dynamic scheduling may refer to a scheduling mode in which the network device indicates, by using signaling, a transmission resource of transmitting uplink data each time by the terminal. Optionally, implementation of the uplink data transmission performed by the terminal can be understood as follows: Two or more terminals are allowed to transmit uplink data on a same time-frequency resource. Optionally, the transmission resource may be a transmission resource in at least one transmission time unit following a moment at which the terminal receives the signaling. One transmission time unit may refer to a minimum time unit for transmission performed once, for example, a TTI, and a value may be 1 ms; or the transmission time unit may be a preset transmission time unit.

The grant-free transmission may mean that a terminal transmits uplink data without a requirement of a grant from a network device. The grant may mean that the terminal sends an uplink scheduling request to the network device, and after receiving the scheduling request, the network device sends an uplink grant to the terminal, where the uplink grant indicates an uplink transmission resource allocated to the terminal.

The grant-free transmission may refer to a contention transmission mode and may specifically mean that a plurality of terminals simultaneously transmit uplink data on a same pre-allocated time-frequency resource without a requirement of a grant from a base station.

The data may include service data or signaling data.

The blind detection may be understood as detection performed, when it is unknown in advance whether data arrives, on data that may arrive. The blind detection may be also understood as detection performed without an explicit signaling indication.

The transmission resource may include but is not limited to a combination of one or more of the following resources:

a time domain resource, such as a radio frame, a subframe, a symbol, a slot, or a mini-slot;

a frequency domain resource, such as a subcarrier or a sub-band;

a space domain resource, such as a transmit antenna or a beam;

a code domain resource, such as a sparse code multiple access (SCMA) codebook, a low density signature (LDS) sequence, or a CDMA code; and an uplink pilot resource.

An uplink transmission technical solution provided in the embodiments of this application may be applied to various communications systems in wireless cellular networks, for example, a global system for mobile communications (GSM), a code division multiple access (CDMA) system, a wideband code division multiple access (WCDMA) system, a general packet radio service (GPRS) system, a long term evolution (LTE) system, a universal mobile telecommunications system (UMTS), a next generation mobile communications system (for example, 5G), and a machine-to-machine (M2M) communications system.

An embodiment of this application provides a communications system 100. The communications system 100 includes at least the following: at least one network device 20 and a plurality of terminals such as a terminal 1, a terminal 2, a terminal 3, and a terminal 4. Some of these terminals may communicate with each other, for example, the terminal 3 and the terminal 4, or some of these terminals may be alternatively used for cellular communication, for example, the terminal 1, the terminal 2, and the terminal 4. The terminals may communicate with each other in a communication mode such as device-to-device (D2D), machine-to-machine (M2M), or user equipment (UE) cooperation. The cellular communication is communication between a terminal and a network device. A control node 60 connected to the network device 20 may perform unified scheduling on resources in the system together, and may configure a resource for a terminal, decide on resource reuse, perform interference coordination, or the like.

The network device mentioned in this embodiment of this application is an apparatus deployed in a radio access network and configured to provide a wireless communication function for the terminal. The network device may include a device obtained by improving or upgrading a base station in a conventional wireless communications system. The base station mentioned herein may include a macro base station, a micro base station (also referred to as a small cell), a relay node, an access point, or the like in various forms. In a system using different radio access technologies, a device having a base station function may have different name. For example, the device is referred to as an evolved NodeB (eNB, or eNodeB) in an LTE system, or is referred to as a NodeB or the like in a 3rd generation (3G) system. In the LTE system, the device is referred to as an evolved universal terrestrial radio access network (E-UTRAN) NodeB (eNB). In a next generation communications system, "gNB" may be used to replace the eNB in the LTE system. Certainly, there may be another name.

The control node in the embodiments of this application, such as the control node 60 in the communications system, may be connected to a plurality of base stations, and may configure resources for a plurality of terminals in coverage of the plurality of base stations. The control node may be radio network controller, or the like.

The terminal in the embodiments of this application, such as the terminal 1, the terminal 2, or the terminal 3 in the communications system 100, may include various handheld devices, vehicle-mounted devices, wearable devices, or computing devices with a wireless communication function, or other processing devices connected to a wireless modem. The terminal may be also referred to as a mobile station (MS), and may further include a subscriber unit, a cellular phone, a smartphone, a wireless data card, and a personal digital assistant (PDA), a tablet computer, a wireless modem, a handheld device, a laptop computer, a cordless phone or a wireless local loop (WLL) station, a machine type communication (MTC) terminal, or the like. For ease of description, in all embodiments of this application, the foregoing devices are collectively referred to as a terminal.

A system architecture and a service scenario described in the embodiments of this application are intended to more clearly describe the technical solution in the embodiments of this application, and do not constitute a limitation on the technical solutions provided in the embodiments of this application. A person of ordinary skill in the art may learn that, with evolution of a network architecture and emergence of a new service scenario, the technical solutions provided in the embodiments of this application are also applicable to similar technical problems.

The foregoing describes an application scenario of this embodiment of this application. The following describes a process of implementing the data transmission method in this embodiment of this application separately from perspectives of a network device and a terminal. Before this, a process of dividing an uplink transmission time-frequency resource in this embodiment of this application is first described in detail.

In the prior art, the network device reserves, for the terminal, a time-frequency resource used for uplink grant-free transmission, or a contention transmission unit (CTU) used for grant-free transmission, and notifies the terminal of a plurality of transmission resources. When the terminal needs to transmit uplink data, the terminal selects at least one transmission resource from the plurality of transmission resources pre-allocated by the network device, and sends the uplink data by using the selected transmission resource. The network device detects, on one or more of the plurality of pre-allocated transmission resources, the uplink data transmitted by the terminal. The detection may be blind detection, detection performed based on a specific control field in the uplink data, or detection performed in another manner.

In this embodiment of this application, division of the uplink transmission time-frequency resource is to further divide the uplink transmission time-frequency resource used for the grant-free transmission into a plurality of time-frequency resource blocks. In this way, when the terminal performs uplink transmission on a time-frequency resource with a relatively narrow bandwidth, a transmit power of the terminal can be enhanced, and better transmission performance can be obtained.

It should be noted that the uplink transmission time-frequency resource can be configured within a range of a time-frequency resource used by a group of terminals to perform uplink grant-free transmission, or a time-frequency resource of an entire bandwidth. In the foregoing two manners, sizes of time-frequency resource blocks may be different, or may be the same. Specifically, the time-frequency resource blocks are distinguished in a dimension of frequency domain by using sub-bands. The plurality of time-frequency resource blocks occupy a same bandwidth, or at least two of the plurality of time-frequency resource blocks occupy different bandwidths. A quantity of subcarriers included in each sub-band may be the same or different. In an implementation, each time-frequency resource block is a sub-band.

The time-frequency resource blocks are distinguished by using a subframe, a slot, or a mini-slot in a dimension of time domain. The time-frequency resource blocks occupy a same quantity of symbols in time domain, or at least two time-frequency resource blocks occupy different quantities of symbols in time domain. The time-frequency resource may be flexibly divided as required. The terminal may flexibly select, based on a transmission requirement, a size of a time-frequency resource block suitable for current transmission.

It should be noted that, for division of the time-frequency resource blocks, the time-frequency resource may be first divided into a plurality of sub-bands in frequency domain.

Optionally, a sub-band is then divided into a plurality of time-frequency resource blocks in time domain. Alternatively, the time-frequency resource may be first divided into a plurality of small time-frequency resources in time domain, and then a time-frequency resource in a time domain unit is divided into sub-bands in frequency domain.

In an implementation, the network device divides the uplink transmission time-frequency resource into the plurality of time-frequency resource blocks, and stores the uplink transmission time-frequency resource divided into the plurality of time-frequency resource blocks.

In another implementation, a device development or maintenance person configures, for the network device, a table or parameter information indicating division of the uplink transmission time-frequency resource into the plurality of time-frequency resource blocks.

Manners of dividing the uplink transmission time-frequency resource include but are not limited to the following two manners:

Manner 1: The uplink transmission time-frequency resource is associated with a specific terminal group. For example, the uplink transmission time-frequency resource is first divided based on a terminal group, and then an uplink transmission time-frequency resource of each terminal group is further divided into different time-frequency resource blocks. Alternatively, the uplink transmission time-frequency resource is further divided into different time-frequency resource blocks, and then the time-frequency resource blocks are allocated to different terminal groups.

Specifically, the grant-free uplink transmission time-frequency resource configured by the network device for a plurality of terminals is first divided into two parts of resources. A first part of resource is shared by a terminal group 1, and a second part of resource is shared by a terminal group 2. Further, the first part of resource is further divided into a time-frequency resource block 1-1, a time-frequency resource block 1-2, a time-frequency resource block 2, a time-frequency resource block 3, and a time-frequency resource block 4-1, and time-frequency resource block 4-2. The second part of resource is further divided by the network device into a time-frequency resource block 1, a time-frequency resource block 2, a time-frequency resource block 3, and a time-frequency resource block 4-1 and a time-frequency resource block 4-2. The time-frequency resource block 1-1 and the time-frequency resource block 1-2 herein occupy a same sub-band bandwidth (both of which occupy a sub-band 1) in time domain, but both occupy different slots. For example, the time-frequency resource block 1-1 occupies a slot 1, and the time-frequency resource block 1-2 occupies a slot 2. Likewise, the time-frequency resource block 4-1 and the time-frequency resource block 4-2 occupy a same bandwidth but both occupy different slots. It should be noted that the sub-band herein includes different quantities of subcarriers, and the slot includes different quantities of symbols.

Another implementation is: the grant-free uplink transmission time-frequency resource configured by the network device for the plurality of terminals is first divided into two parts of resources. A first part of resource is shared by the terminal group 1, and a second part of resource is shared by the terminal group 2. Further, the first part of resource is further divided by the network device into a plurality of time-frequency resource blocks, and each time-frequency resource block is one sub-band, for example, a sub-band 1, a sub-band 2, sub-band 3, and a sub-band 4. The second part of resource is further divided by the network device into a sub-band 1, a sub-band 2, a sub-band 3, and a sub-band 4.

Through this division, the network device may control the transmission resource more accurately. When performing detection on a different time-frequency resource block, the network device may know a specific terminal group that uses the time-frequency resource block, thereby improving detection efficiency.

Manner 2: Terminal groups are not distinguished, in other words, the uplink transmission time-frequency resource is directly divided into different time-frequency resource blocks, and when selecting a specific time-frequency resource block, the terminal performs uplink transmission by using a corresponding time-frequency resource block.

Specifically, the grant-free uplink transmission time-frequency resource configured by the network device for a plurality of terminals is directly divided by the network device into a time-frequency resource block 1-1, a time-frequency resource block 1-2, a time-frequency resource block 2, a time-frequency resource block 3, a time-frequency resource block 4-1, a time-frequency resource block 4-2, a time-frequency resource block 5, a time-frequency resource block 6, a time-frequency resource block 7, and a time-frequency resource block 8. The time-frequency resource block 1 to the time-frequency resource block 8 may be shared by the plurality of terminals.

Another implementation is: the grant-free uplink transmission time-frequency resource configured by the network device for the plurality of terminals is directly divided by the network device into a plurality of time-frequency resource blocks, and each time-frequency resource block is a sub-band, for example, a sub-band 1, a sub-band 2, a sub-band 3, a sub-band 4, a sub-band 5, a sub-band 6, a sub-band 7, and a sub-band 8. The sub-band 1 to the sub-band 8 may be shared by the plurality of terminals.

Through this division, the terminal may more flexibly select the time-frequency resource block, and transmission performance is better.

In the foregoing two manners, sizes of the time-frequency resource blocks may be different or the same. Specifically, the time-frequency resource blocks are distinguished in a dimension of frequency domain by using sub-bands, and bandwidths occupied by the sub-bands of the time-frequency resource blocks may be the same or different. It should be understood that a granularity of a sub-band may be a subcarrier, an RB, or an RBG. Sub-bands are distinguished by using quantities of symbols in a dimension of time domain. The quantities of symbols of the sub-bands may be the same or different, and can be divided as required. The terminal may flexibly select, based on a transmission requirement, a size of a time-frequency resource block suitable for current transmission. Certainly, this is only an example. Sub-bands may be alternatively distinguished by using a slot or a mini-slot in a dimension of time domain.

Based on the foregoing two manners in which the uplink transmission time-frequency resource is divided into the time-frequency resource blocks, the network device in the embodiments of this application further configures corresponding configuration information for the time-frequency resource blocks. The configuration information mainly includes a time-frequency resource block parameter and a coverage enhancement parameter. The time-frequency resource block parameter herein is information related to a time-frequency resource block, for example, one or more of the following: identification information (a start position or an index number) of the time-frequency resource block, a quantity of time-frequency resource blocks, an upper limit of the quantity, a granularity of the time-frequency resource block, and a length of the granularity. The coverage enhancement parameter is a parameter used to increase a receive signal-to-noise ratio and meet a coverage requirement by increasing a signal receiving power, for example, a power control parameter, a TTI bundling size indication, or a repetition size indication.

The network device divides the uplink transmission time-frequency resource used for grant-free transmission into the plurality of uplink transmission time-frequency resource blocks, and configures corresponding configuration information for each uplink transmission time-frequency resource block. Base on this, a data transmission method provided in an embodiment of this application includes the following operations:

Step 101: The network device sends, to a terminal, information about a time-frequency resource used for transmitting uplink data, where the time-frequency resource includes a plurality of time-frequency resource blocks, the information about the time-frequency resource includes each time-frequency resource block and configuration information corresponding to the time-frequency resource block, the configuration information includes at least identification information of the corresponding time-frequency resource block, and the identification information may be a start position or an index number of the time-frequency resource block; and optionally, before the terminal needs to send the uplink data, the network device sends, to the terminal, the information about the time-frequency resource used for transmitting the uplink data.

Step 102: The terminal stores the plurality of time-frequency resource blocks and the corresponding configuration information that are allocated by the network device.

Step 103: When the terminal needs to send the uplink data, the terminal selects, from the plurality of time-frequency resource blocks, at least one time-frequency resource block used for transmitting the uplink data.

Step 104: The terminal transmits the uplink data on the at least one selected time-frequency resource block based on configuration information of the at least one selected time-frequency resource block.

Step 105: The network device receives the uplink data sent by the terminal to the network device on the time-frequency resource block.

In the data transmission method provided in this application, the uplink transmission time-frequency resource pre-allocated by the network device to the terminal is divided into the plurality of time-frequency resource blocks, and therefore, the terminal may select a time-frequency resource with a relatively narrow bandwidth to transmit the uplink data, thereby increasing a transmit power of the terminal. Further, the network device further configures the configuration information for each time-frequency resource block. The configuration information may carry a time-frequency resource block parameter or a coverage enhancement parameter, or both two parameters. Therefore, after selecting the time-frequency resource block used for transmitting the uplink data, the terminal transmits the uplink data based on the corresponding configuration information, to further increase a transmit power. In addition, the network device may further perform demodulation on a correct time-frequency resource block based on the configuration information, to improve demodulation efficiency and avoid generating a processing latency.

In the data transmission method provided in this embodiment of this application, when dividing the uplink transmission resource in Manner 1, the network device associates the time-frequency resource block with the terminal group. Information used for the association process includes:

Information 1: information about division of time-frequency resource blocks in uplink transmission time-frequency resources specific to the plurality of terminal groups, where Information 1 may be sent to all terminals in a cell, or may be used to notify a terminal in each terminal group of division of an uplink transmission time-frequency resource corresponding to the terminal group to which the terminal belongs;

Information 2: a coverage enhancement parameter corresponding to the time-frequency resource block, where Information 2 may be sent to a plurality of terminals in the terminal group; and Information 3: a mapping relationship between the time-frequency resource block and the terminal group.

The information 3 may be sent to terminals in a same terminal group.

Information 1 is a basic configuration for the terminal to perform grant-free transmission, and is used to indicate the uplink transmission time-frequency resource reserved by the network device for the terminal group or the terminal. Information 2 and Information 3 are optional, and a coverage enhancement parameter related to Information 2 and Information 3 is used to instruct the terminal to use the uplink transmission time-frequency resource to enhance coverage. The identification information in the configuration information of the time-frequency resource block may be a start position or an index number of the time-frequency resource block in Information 1.

Specifically, when dividing the uplink transmission time-frequency resource specific to the plurality of terminal groups, the network device may allocate an index number to each time-frequency resource block. Details are shown in Table 1:

TABLE 1

| Time-frequency resource block | Index number |
| --- | --- |
| Time-frequency resource block 1 | 1 |
| Time-frequency resource block 2 | 2 |
| Time-frequency resource block 3 | 3 |
| Time-frequency resource block 4 | 4 |
| Time-frequency resource block 5 | 5 |
| Time-frequency resource block 6 | 6 |
| Time-frequency resource block 7 | 7 |
| Time-frequency resource block 8 | 8 |

When selecting a time-frequency resource block to perform uplink transmission, the terminal may send, to the network device, an index number of the time-frequency resource block selected by the terminal, so that the network device can perform accurate detection.

If the mapping relationship between the time-frequency resource block and the terminal group is added, details are shown in Table 2:

TABLE 2

| Time-frequency resource block | Index number | Terminal group to which a terminal belongs |
| --- | --- | --- |
| Time-frequency resource block 1 | 1 | 1 |
| Time-frequency resource block 2 | 2 | 1 |
| Time-frequency resource block 3 | 3 | 1 |
| Time-frequency resource block 4 | 4 | 1 |
| Time-frequency resource block 5 | 5 | 2 |
| Time-frequency resource block 6 | 6 | 2 |
| Time-frequency resource block 7 | 7 | 2 |
| Time-frequency resource block 8 | 8 | 2 |

Information 2 including the time-frequency resource block parameter or the coverage enhancement parameter is described in detail below.

In an implementation, Information 1, Information 2, and Information 3 may be carried in a system message, radio resource control (RRC) signaling, a medium access control, control element (MAC CE), or downlink control information (DCI).

With reference to an amount of information that can be carried in signaling, a signaling combination shown in Table 3 is used to carry the configuration information.

TABLE 3

| Process procedure | System message | RRC signaling | MAC CE | DCI |
|---|---|---|---|---|
| Manner 1 | Information 1 | Information 2 and Information 3 | | |
| Manner 2 | Information 1 | Information 2 | Information 3 | |
| Manner 3 | Information 1 | Information 2 | | Information 3 |
| Manner 4 | Information 1 | | Information 2 and Information 3 | |
| Manner 5 | Information 1 | | Information 2 | Information 3 |
| Manner 6 | | Information 1, Information 2, and Information 3 | | |
| Manner 7 | | Information 1 | Information 2 and Information 3 | |
| Manner 8 | | Information 1 | Information 2 | Information 3 |

In an implementation, when performing system configuration, the network device may send Information 1 to the terminal by using a system message. Then when an RRC bearer is set up, the network device sends Information 2 and Information 3 to the terminal by using RRC signaling. In another manner, Information 1, Information 2, and Information 3 are carried in RRC signaling. In this case, signaling overheads are reduced and high flexibility is obtained.

It should be understood that Manner 1 to Manner 8 are only examples. The network device may further send the configuration information to the terminal through more signaling combinations based on an actual requirement.

The following describes, from a perspective of different signaling bearer manners, an implementation process of the data transmission method in this embodiment of this application in Manner 1 in which an uplink transmission time-frequency resource is divided into time-frequency resource blocks and is associated with the terminal group. It should be understood that the following embodiments describe configuration information of the time-frequency resource blocks and a configuration information carrying manner when the plurality of time-frequency resource blocks obtained by dividing the uplink transmission time-frequency resource are specifically in a form of a plurality of sub-bands. If the time-frequency resource block is divided into smaller time-frequency resource blocks in a dimension of time domain, corresponding slots or symbol identifiers are added to indication manners such as start positions, a quantity, lengths, and the like of the smaller time-frequency resource blocks.

Embodiment 1: Adding Configuration Information to RRC Signaling

In this manner, new RRC signaling is defined, and configuration information is transferred by using RRC connection setup signaling.

In a first implementation of Embodiment 1, configuration information carried in RRC includes division information of a time-frequency resource block, for example, a start position of the time-frequency resource block, so that the terminal can select a proper time-frequency resource block for transmission. Herein, a length of the time-frequency resource block extends to a start position of a next time-frequency resource block by default.

For example, the time-frequency resource block is a sub-band, and a message format of the time-frequency resource block is denoted as follows:

```
-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::=   SEQUENCE {
      StartPoint                              BIT STRING (SIZE(4)) // a start position of
a sub-band, occupying four bits, where 16 different positions can be indicated in a binary mode
      }// a configuration of each sub-band
    -- ASN1STOP.
```

If the time-frequency resource block is further divided into a smaller time-frequency resource block in a dimension of time domain based on a sub-band, in the foregoing configuration message, a start position in time domain is further carried, for example, a specific symbol.

In this embodiment of this application, the uplink time-frequency resource may be alternatively first divided in a dimension of time domain, and then the uplink time-frequency resource is divided in a dimension of frequency domain to obtain a plurality of time-frequency resource blocks. Principles of subsequent embodiments are the same, and details are not described herein.

In a second implementation of Embodiment 1, configuration information carried in RRC includes division information of a time-frequency resource block, for example, a length of the time-frequency resource block, so that the terminal can select a proper time-frequency resource block for transmission, to increase a transmit power. Herein, a start position of a first time-frequency resource block in frequency domain may be a start position of an available sub-band, and a start position of a subsequent sub-band is "the start position of the available sub-band plus a length of all previous sub-bands plus 1". A start position of the first time-frequency resource block in time domain may be a start position of an available symbol, and a start position of a subsequent time-frequency resource block is "the start position of the available symbol plus a length of all previous symbols plus 1".

For example, the time-frequency resource block is a sub-band, and a message format of the time-frequency resource block is denoted as follows:

```
-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::=   SEQUENCE {
        Length                              ENUMERATED {n1, n2, n4,
n8, n16, n32}, // a length of each sub-band, for example, a frequency-domain width of a
sub-band, where a basic unit of the frequency-domain width is configured by the system, for
example, a subcarrier; and in this case, length indicates a quantity of subcarriers included in the
sub-band
    }// a configuration of each sub-band
    --ASN1STOP.
```

If the time-frequency resource block is further divided into a smaller time-frequency resource block in a dimension of time domain, in the foregoing message format, a length in the time domain may be further carried, for example, "a start position of an available symbol plus a length of all previous symbols plus 1".

In a third implementation of Embodiment 1, configuration information carried in RRC includes division information of a time-frequency resource block, for example, a start position of the time-frequency resource block and a length of the time-frequency resource block, so that the terminal can select a proper time-frequency resource block for transmission, to increase a transmit power.

For example, the time-frequency resource block is a sub-band, and a message format of the time-frequency resource block is denoted as follows:

```
-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::=   SEQUENCE {
        StartPoint                              BIT STRING (SIZE(4)) // a start position of
a sub-band, occupying four bits, where 16 different positions can be indicated in a binary mode
        Length ENUMERATED {n1, n2, n4, n8, n16, n32}, // a length of a sub-band, for
example, a frequency-domain width of a sub-band, a basic unit of the frequency-domain width is
configured by the system, for example, a subcarrier, and in this case, length indicates a quantity
of subcarriers included in the sub-band
    }// a configuration of each sub-band
    -- ASN1STOP.
```

If the time-frequency resource block is further divided into a smaller time-frequency resource block in a dimension of time domain based on a sub-band, in the foregoing message format, a start position and a length in time domain are further carried. For example, "a fourth symbol is at a start position and has a length of n".

In a fourth implementation of Embodiment 1, configuration information carried in RRC not only includes division information of a time-frequency resource block, but also includes a power control parameter corresponding to the time-frequency resource block. When the terminal sends uplink data by using different time-frequency resource blocks, power level configurations corresponding to different time-frequency resource blocks are different, thereby improving coverage enhancement. In an implementation, the network device may quantize a power level by using three bits. 000 represents that a transmit power of $(½°)$ of a total power is used for transmission, and 001 represents that $(½)^1$ of a total power is used for transmission, and so on.

For example, the time-frequency resource block is a sub-band, and a message format of the time-frequency resource block is denoted as follows:

```
-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::=  SEQUENCE {
      StartPoint                          BIT STRING (SIZE(4)) // a start position of
a sub-band, occupying four bits, where 16 different positions can be indicated in a binary mode
      Length ENUMERATED {n1, n2, n4, n8, n16, n32}, // a length of each sub-band,
for example, a frequency-domain width of a sub-band, a basic unit of the frequency-domain
width is configured by the system, for example, a subcarrier, and in this case, length indicates a
quantity of subcarriers included in the sub-band
      PowerLeveL                         BIT STRING (SIZE(3))    // a power
control parameter of a sub-band, occupying three bits, where eight different positions can be
indicated in a binary mode
    }// a configuration of each sub-band
-- ASN1STOP.
```

If the time-frequency resource block is further divided into a smaller time-frequency resource block in a dimension of time domain, in the foregoing message format, a power control parameter of the time-frequency resource block may be indicated.

In the foregoing four implementations, meanings of the fields are as follows:

| NarrowbandConfigList field descriptions |
|---|
| StartPoint |
| Indicates a start position of a sub-band, where 0001 represents a first RB, 0010 represents a second RB, and so on. |
| Length |
| Herein, n1 represents a length 1, n2 represents a length 2, n4 represents a length 4, and so on, where a transmission granularity set by a system is used as a unit. |
| PowerLeveL |
| Quantizes a power level by using three bits, where 000 indicates that a transmit power of $(½)^0$ of a total power is used for transmission, and 001 indicates that $(½)^1$ of a total power is used for transmission, and so on. |

Further, for RRC signaling, the network device may further define an upper limit of a quantity of time-frequency resource blocks. For example, the time-frequency resource block is a sub-band. The following shows an example:

maxNarrowband INTEGER::=8.

Further, the network device may further define an end position of the time-frequency resource block. In this case, the division information of the time-frequency resource block may not include the length of the time-frequency resource block, and the length of the time-frequency resource block is from the start position to the end position of the time-frequency resource block.

For example, the time-frequency resource block is a sub-band, and the configuration information carried in the RRC includes the start position of the sub-band and the length of the sub-band. The following shows an example:

EndPoint BIT STRING (SIZE(5)).

It should be understood that the indications and values of the foregoing fields are only examples. An implementation of this embodiment of this application is not limited thereto.

Embodiment 2: Adding Configuration Information to MAC CE Signaling

In Embodiment 2, the network device needs to define a new MAC CE and a corresponding MAC subheader (subheader).

Each sub-band is configured by using one MAC CE. If the network device needs to indicate configurations of a plurality of time-frequency resource blocks to the terminal, the network device sends a plurality of MAC CEs to the terminal.

Meanings of fields of the new MAC CE are as follows:

| |
|---|
| StartPoint |
| Indicates a start position of a time-frequency resource block, where 0001 represents a first RB, 0010 represents a second RB, and so on. |
| Length |
| 0000 represents a length 1, 0001 represents a length 2, 0010 represents a length 4, and so on. |
| PowerLeveL |
| Quantizes a power level by using three bits, where 000 indicates that a transmit power of $(½)^0$ of a total power is used for transmission, and 001 indicates that $(½)^1$ of a total power is used for transmission, and so on. |
| R |
| Indicates a reserved bit. |

A corresponding MAC subheader is shown in FIG. 1. Correspondingly, an logical channel identifier (LCID) corresponding to the newly defined MAC CE is shown in Table 4. A reserved field of TS 36321-e00, for example, 10111, can be used for the LCID to associate the newly defined MAC CE.

TABLE 4

Values of an LCID for a downlink shared channel (Values of LCID for DL-SCH)

| Index value (Index) | LCID value (LCID values) |
|---|---|
| 00000 | Common control channel (CCCH) |
| 00001-01010 | Identity of a logical channel |
| 01011-10110 | Reserved |
| 10111 | Narrowband configuration |
| 11000 | Activation/Deactivation (four octets) |
| 11001 | SC-MCCH, SC-MTCH (see note) |
| 11010 | Long discontinuous reception (DRX) command |
| 11011 | Activation/Deactivation (one octet) |
| 11100 | UE contention resolution identity |
| 11101 | Timing advance command |
| 11110 | DRX command |
| 11111 | Padding |

NOTE:
Neither SC-MCCH nor SC-MTCH can be multiplexed with other logical channels in a same MAC PDU except for padding.

It should be understood that indicating the MAC CE by using the reserved field 10111 is only an example. In another implementation, the MAC CE may be alternatively indicated by using another reserved field.

Figure 2:
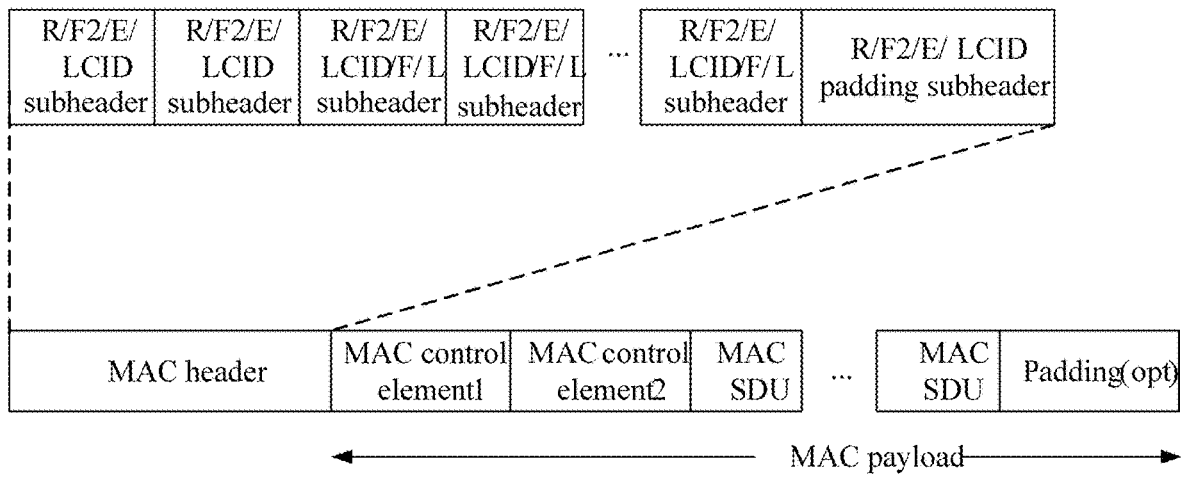
FIG. 2 is a schematic diagram of transmitting MAC CE signaling in a MAC PDU according to an embodiment of this application.

Alternatively, the newly defined MAC CE may be carried in a newly defined MAC protocol data unit (MAC PDU) format. As shown in FIG. 2, the MAC CE may be alternatively carried in a MAC SDU on a downlink shared channel (DL-SCH) defined in an existing LTE protocol.

To enable the terminal to select a corresponding time-frequency resource block based on a transmission requirement, in this embodiment of this application, the network device may further configure a granularity of the time-frequency resource block, that is, the granularity of the time-frequency resource block may be further carried in the configuration information, and the granularity of the time-frequency resource block is a subcarrier, an resource block (RB), or an resource block group (RBG). Herein, one RB includes 12 subcarriers.

In an implementation, the network device may use 2-bit information to indicate a subcarrier, an RB, or an RBG, as shown in Table 5:

TABLE 5

| Sub-band granularity indication | Description |
|---|---|
| 00 | Retained |
| 01 | Subcarrier |
| 10 | RB |
| 11 | RBG |

Embodiment 3: Adding Configuration Information to DCI

In this embodiment, the configuration information is carried in the DCI, and the DCI is carried on a physical downlink control channel (PDCCH). The PDCCH is scrambled by using an radio network temporary identifier (RNTI) of a terminal group, and the network device may perform configuration for one or more terminals in the terminal group.

For example, the time-frequency resource block is a sub-band. A newly defined DCI format includes the following information:
Number of narrowband—3 bits
For narrowband 1:
Start point—4 bits
For narrowband 2:
Start point—4 bits.

Optionally, length information of the sub-band may be further included in the DCI format:
Length—3 bits.
Number of Narrowband provides a quantity of sub-bands configured in a current DCI message.
Start Point represents a start position of the sub-band. 0001 represents starting from a first RB, 0010 represents starting from a second RB, and so on.
Length represents a length of the sub-band. 0000 represents a length 1, 0001 represents a length 2, 0010 represents a length 4, and so on.

When sub-bands are continuously configured, an end position of a previous sub-band may be obtained through "a start position-1 of a current sub-band". Therefore, the configuration of the sub-bands may not include the length field.

Similarly, the start position and an end position of the sub-band may be further configured.

Similarly, the configuration information that includes the sub-band granularity indication may be alternatively carried in a system message, RRC signaling, a MAC CE, or DCI. Details are described below.

If the time-frequency resource block is further divided into a smaller time-frequency resource block in a dimension of time domain based on a sub-band, in the foregoing DCI message format, parameter information in time domain is included.

Embodiment 4: Adding Configuration Information that Includes a Granularity Indication of a Time-Frequency Resource Block to a System Message In this embodiment, the network device adds a new RRC information element in the system message to indicate the granularity of the time-frequency resource block.

For example, the time-frequency resource block is a sub-band, and a message format of the time-frequency resource block is denoted as follows:

```
-- ASN1START
NarrowbandConfigCommon ::= SEQUENCE {
    Width                BIT STRING (SIZE(2))    // using two bits to
indicate a maximum of four possible widths
    } // such information element being used to indicate the granularity and serving as a
"common element" used for a sub-band configuration, where the information element is
delivered by the system message, and therefore, the information element can be used for all
sub-band configurations and can be used by all terminals
    -- ASN1STOP.
```

Meanings of fields are as follows:

| Width |
|---|
| Indicates a granularity of a sub-band, where 01 represents a subcarrier, 10 Represents an RB, and 11 represents an RBG. |

Granularity indication information of the sub-band may be added to "RadioResourceConfigComm-onSIB" defined in LTE, and is transmitted by the network device to the terminal by using the system message.

For example, the time-frequency resource block is a sub-band, and a message format of the time-frequency resource block is denoted as follows:

```
RadioResourceConfigCommonSIE ::= SEQUENCE {
   rach-ConfigCommon              RACH-ConfigCommon,
   bcch-Config                    BCCH-Config,
   pcch-Config                    PCCH-Config,
   prach-Config                   PRACH-ConfigSIB,
   pdsch-ConfigCommon
PDSCH-ConfigCommon,
   pusch-ConfigCommon
PUSCH-ConfigCommon,
   pucch-ConfigCommon
PUCCH-ConfigCommon,
   soundingRS-UL-ConfigCommon
SoundingRS-UL-ConfigCommon,
   uplinkPowerControlCommon       UplinkPowerControlCommon,
   ul-CyclicPrefixLength          UL-CyclicPrefixLength,
   narrowband-ConfigCommon    NarrowbandConfigCommon,
   ...,
   [       uplinkPowerControlCommon-v1020 UplinkPowerControlCommon-v1020
OPTIONAL    -- Need OR
   ]
}.
```

If the time-frequency resource block is divided into a smaller time-frequency resource block in a dimension of time domain, in the foregoing DCI message format, parameter information in time domain may be included. Principles of the embodiments are the same, and details are not described herein.

Embodiment 5: Adding Configuration Information that Includes a Granularity Indication of a Time-Frequency Resource Block to RRC Signaling In this embodiment, the network device newly adds an RRC information element to indicate the granularity of the time-frequency resource block.

For example, the time-frequency resource block is a sub-band, and a message format of the time-frequency resource block is denoted as follows:

```
   -- ASN1START
      NarrowbandConfigCommon ::=   SEQUENCE {
      Width                        BIT STRING (SIZE(2))
}// such information element being used to indicate the granularity and
serving as a "common element" used for a sub-band configuration,
where the information element is delivered by an RRC message, the
message is intended for a group or a user, and therefore, different
granularity configurations may exist between user groups or users
-- ASN1STOP.
```

Meanings of fields are as follows:

| Width |
|---|
| Indicates a granularity of a sub-band, where 01 represents a subcarrier, 10 represents an RB, and 11 represents an RBG. |

Granularity indication information of the sub-band may be added to "RRCConnectionSetup message" or "RRC ConnectionReconfiguration message" defined in LTE, and is transmitted by the network device to the terminal by using the RRC signaling.

If the time-frequency resource block is divided into a smaller time-frequency resource block in a dimension of time domain, in the foregoing DCI message format, parameter information in time domain may be included.

Figure 3:
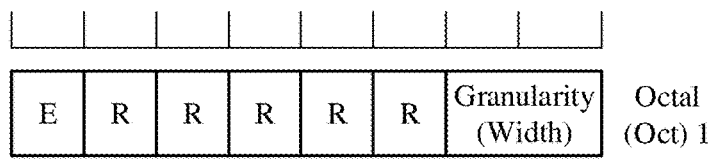
FIG. 3 is another schematic diagram of MAC CE signaling according to an embodiment of this application.

Embodiment 6: Adding Configuration Information that Includes a Granularity Indication of a Time-Frequency Resource Block to a MAC CE In an implementation of Embodiment 6, a new MAC CE is defined, and a corresponding LCID is defined. Specific representation is shown in FIG. 3.

Meanings of fields are as follows:

| Width |
|---|
| Indicates a granularity of a time-frequency resource block, where 01 represents a subcarrier, 10 represents an RB, and 11 represents an RBG. |
| R |
| Indicates a reserved bit. |

Similarly, the new LCID corresponding to the MAC CE needs to be defined. A reserved field of TS 36321-e00 may be used for the LCID. In this embodiment, 10110 is selected to associate the newly defined MAC CE. An updated table is shown in Table 6:

TABLE 6

Values of an LCID for a downlink shared
channel (Values of LCID for DL-SCH)

| Index (Index) | LCID value (LCID values) |
|---|---|
| 00000 | Common control channel (CCCH) |
| 00001-01010 | Identity of a logical channel |
| 01011-10101 | Reserved |
| 10110 | Narrowband width |
| 10111 | Narrowband configuration |
| 11000 | Activation/Deactivation (four octets) |
| 11001 | SC-MCCH, SC-MTCH (see note) |
| 11010 | Long DRX command |
| 11011 | Activation/Deactivation (one octet) |
| 11100 | UE contention resolution identity |
| 11101 | Timing advance command |
| 11110 | DRX command |
| 11111 | Padding |

NOTE:
Neither SC-MCCH nor SC-MTCH can be multiplexed with other logical channels in a same MAC PDU except for padding.

It should be understood that indicating the MAC CE by using the reserved field 10110 is only an example. In another implementation, the MAC CE may be alternatively indicated by using another reserved field. Similarly, as shown in FIG. 2, the newly defined MAC CE may be alternatively carried in a MAC protocol data unit (MAC PDU) of a downlink shared channel (DL-SCH) defined in an LTE protocol.

Figure 4:
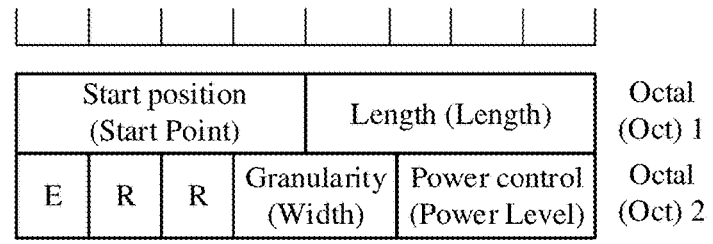
FIG. 4 is another schematic diagram of MAC CE signaling according to an embodiment of this application.
Figure 9:
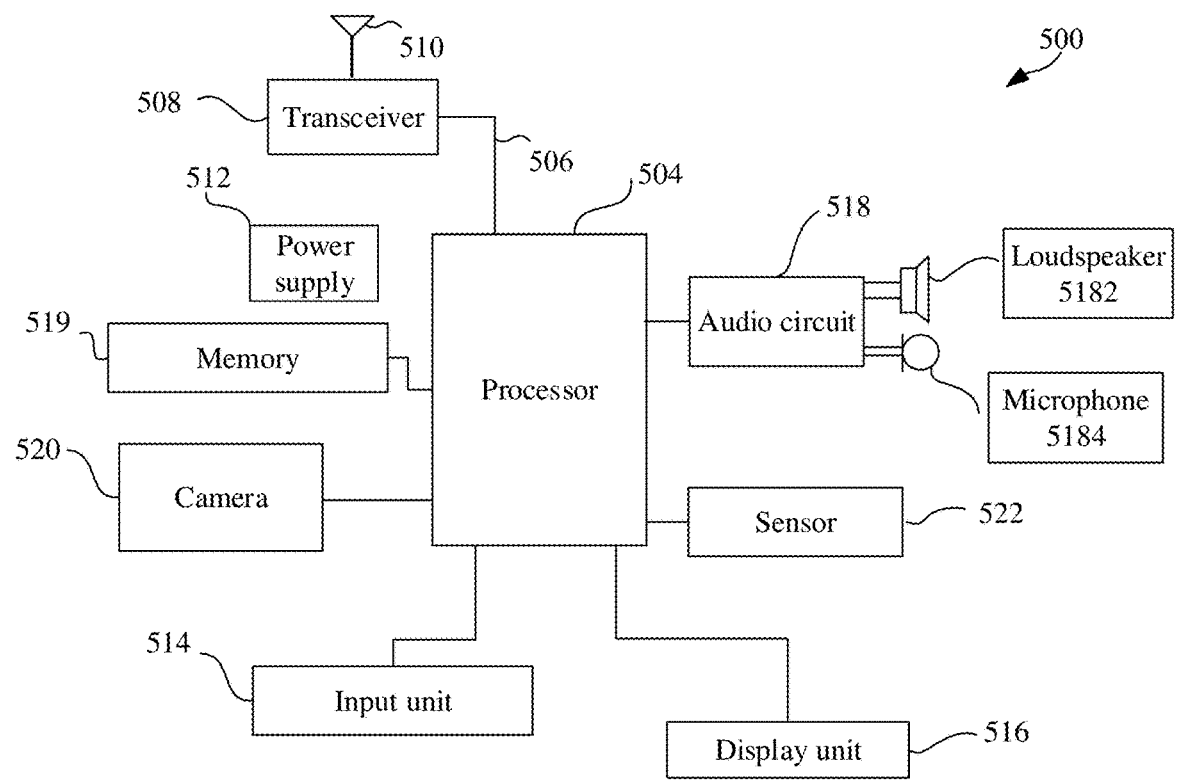
FIG. 9 is a schematic structural diagram of a terminal according to an embodiment of this application.

In a second implementation of Embodiment 6, based on the newly defined MAC CE shown in FIG. 9 in Embodiment 2, the fields are extended to indicate a granularity of a time-frequency resource block. Details are shown in FIG. 4.

Meanings of fields are as follows:

StartPoint

Indicates a start position of a time-frequency resource block, where 0001 represents a first RB, 0010 represents a second RB, and so on.
Length 0000 represents a length 1, 0001 represents a length 2, 0010 represents a length 4, and so on.
PowerLeveL Quantizes a power level by using three bits, where 000 indicates that a transmit power of $(\frac{1}{2})^0$ of a total power is used for transmission, 001 indicates that $(\frac{1}{2})^1$ of a total power is used for transmission, and so on.
Width Indicates a granularity of a time-frequency resource block, where 01 represents a subcarrier, 10 represents an RB, and 11 represents an RBG.
R Indicates a reserved bit.

In this implementation, the value of the LCID corresponding to the MAC CE in Embodiment 2 remains unchanged, that is, there is no need to add a new LCID, and the value in Table 4 can be still used.

To implement coverage enhancement, the terminal may accumulate powers in time domain through TTI bundling or repetition transmission, to increase a demodulation signal-to-noise ratio of the network device.

However, in a grant-free transmission mechanism, if the network device does not know a TTI bundling size or repetition size configuration used by the terminal to perform transmission, the network device needs to attempt to use different binding sizes (bundling size) or different repetition size, s, or even different start position areas to receive data. In this case, demodulation complexity is multiplied because of a plurality of attempts, and a longer processing latency is also introduced. Therefore, in this embodiment of this application, when configuring, for the terminal, the uplink transmission time-frequency resource used for grant-free transmission, the network device may further configure a TTI bundling size or repetition size indication. When the terminal performs uplink transmission based on the TTI bundling size or repetition size indication, the network device may perform demodulation by using a correct bundling size or repetition size.

The TTI bundling size indication is used as an example for description. Details are shown in Table 7:

TABLE 7

| Index number of a time-frequency resource block | Bundling size | Meaning |
|---|---|---|
| 1 | 000 | Size = $2^0$ = 1 |
| 2 | 001 | Size = $2^1$ = 2 |
| 3 | 010 | Size = $2^2$ = 4 |
| ... | ... | ... |
| 4 | 110 | ... |

As shown in Table 7, different bundling sizes may be configured for time-frequency resource blocks with a same bandwidth, to adapt to different service requirements of the terminal.

The TTI bundling size indication or the repetition size indication may be implemented by adding a corresponding field of a TTI bundling size indication to the RRC signaling shown in Embodiment 1 or the MAC CE shown in Embodiment 2. The following still uses a TTI bundling size indication as an example for description in both Embodiment 7 and Embodiment 8.

Embodiment 7: Adding Configuration Information that Includes a TTI Bundling Size Indication to RRC Signaling In this embodiment, new RRC signaling still needs to be defined and is transferred during RRC connection setup.

In an implementation of Embodiment 7, both a power control parameter and the TTI bundling size indication are carried in configuration information. For example, the time-frequency resource block is a sub-band, and a message format of the time-frequency resource block is denoted as follows:

-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::= SEQUENCE {

```
    StartPoint                      BIT STRING (SIZE(4)) // a start position of
each sub-band, where four bits can be used to indicate 16 different start positions
    Length                          ENUMERATED {n1, n2, n4, n8,
n16, n32}, // a frequency-domain width of each sub-band, where a frequency domain unit is a
frequency-domain width or a default value configured by a system, for example, one subcarrier,
and one frequency-domain width is indicated each time
    PowerLeveL                      BIT STRING (SIZE(3))      // a transmit
power level of each sub-band, where three bits may be used to indicate eight different levels in
total, and one power level is indicated each time
    Bundling size                   ENUMERATED {n1, n2, n4, n8, n16, n32, n64}, //
a quantity of time domain resources corresponding to each sub-band, where seven enumerated
types are defined, and one time-domain quantity is indicated each time
        }//a configuration of each sub-band
    -- ASN1STOP.
```

If the time-frequency resource block is further divided into a smaller time-frequency resource block in a dimension of time domain based on a sub-band, in the foregoing DCI message format, parameter information in time domain is included.

In another implementation of Embodiment 7, the TTI bundling size indication is carried but a power control parameter is not included in configuration information. For example, the time-frequency resource block is a sub-band, and a message format of the time-frequency resource block is denoted as follows:

```
    -- ASN1START
    NarrowbandConfigList ::= SEQUENCE (SIZE(1 to maxNarrowband)) OF
NarrowbandConfig // a sub-band configuration list, including configurations of a plurality of
sub-bands; determining a quantity of carried sub-bands in the list by using SIZE (1 to
maxNarrowband); and a maximum configuration of the quantity maxNarrowband of sub-bands
and a minimum configuration of one sub-band
    NarrowbandConfig ::= SEQUENCE {
        StartPoint                  BIT STRING (SIZE(4)) // a start position of
each sub-band, where four bits can be used to indicate 16 different start positions
        Length                      ENUMERATED {n1, n2, n4, n8,
n16, n32}, // a frequency-domain width of each sub-band, where a frequency domain unit is a
frequency-domain width or a default value configured by a system, for example, one subcarrier,
and one frequency-domain width is indicated each time
        Bundling size               ENUMERATED {n1, n2, n4, n8, n16, n32, n64}, //
a quantity of time domain resources corresponding to each sub-band, where seven enumerated
types are defined, and one time domain quantity is indicated each time
    }
    -- ASN1STOP.
```

Meanings of fields are as follows:

Bundling size

Herein, n1 represents a length 1, n2 represents a length 2, n4 represents a length 4, and so on, where a minimum granularity of a resource scheduled in time domain may be used as a unit.

If the time-frequency resource block is divided into a smaller time-frequency resource block in a dimension of time domain, in the foregoing DCI message format, parameter information in time domain may be included.

Embodiment 8: Adding Configuration Information that Includes a TTI Bundling Size Indication to a MAC CE In this embodiment, the network device needs to define a new MAC CE, and one MAC CE is used for configuration of each time-frequency resource block. If the network device needs to indicate configurations of a plurality of time-frequency resource blocks to the terminal, the network device sends a plurality of MAC CEs to the terminal.

Figure 5:
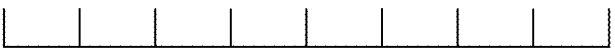
FIG. 5 is another schematic diagram of MAC CE signaling according to an embodiment of this application.

In an implementation of Embodiment 8, both a power control parameter and the TTI bundling size indication are carried in configuration information. The new MAC CE may be defined in FIG. 5. Meaning of fields are as follows:

StartPoint

Indicates a start position of a time-frequency resource block, where 0001 represents a first RB, 0010 represents a second RB, and so on.

Length 0000 represents a length 1, 0001 represents a length 2, 0010 represents a length 4, and so on.

PowerLeveL

Quantizes a power level by using three bits, where 000 indicates that a transmit power of $(1/2)^0$ of a total power is used for transmission, and 001 indicates that $(1/2)^1$ of a total power is used for transmission, and so on.

Bundling size

Herein, n1 represents a length 1, n2 represents a length 2, n4 represents a length 4, and so on, where a minimum granularity of a resource scheduled in time domain may be used as a unit.

R

Indicates a reserved bit.

Figure 6:
FIG. 6 is another schematic diagram of MAC CE signaling according to an embodiment of this application.

In another implementation of Embodiment 8, the TTI bundling size indication is carried but a power control parameter is not included in configuration information. The new MAC CE may be defined in FIG. 6. Meaning of fields are as follows:

StartPoint

Indicates a start position of a time-frequency resource block, where 0001 represents a first RB, 0010 represents a second RB, and so on.
Length 0000 represents a length 1, 0001 represents a length 2, 0010 represents a length 4, and so on.
Bundling size Herein, n1 represents a length 1, n2 represents a length 2, n4 represents a length 4, and so on, where a minimum granularity of a resource scheduled in time domain may be used as a unit.
R Indicates a reserved bit.

In correspondence with the foregoing two MAC CEs, corresponding MAC subheaders (subheader) need to be defined, and the corresponding MAC subheaders are shown in FIG. 1. Details are not described herein.

Embodiment 1 to Embodiment 8 describe, from a perspective of the network device based on Manner 1 in which the uplink transmission time-frequency resource used for grant-free transmission is divided into the plurality of time-frequency resource blocks associated with the terminal group, an implementation process of carrying the configuration information by using RRC, the MAC CE, the system message, and the DCI. Parameters carried in the configuration information are further divided into the power control parameter, the TTI bundling size indication, the granularity, the length, the index number of the time-frequency resource block, or the start position or the end position of the time-frequency resource block, and the like.

The following describes, from a perspective of a terminal side based on an association between a sub-band and the terminal, an implementation of performing uplink transmission by each terminal. The implementation may be roughly classified into the following four manners:

Manner 1: The Terminal Randomly Selects a Time-Frequency Resource Block for Uplink Transmission.

The foregoing network device divides the uplink transmission time-frequency resource used for grant-free transmission into the plurality of time-frequency resource blocks associated with the terminal group, and configures the configuration information for each time-frequency resource block used for uplink transmission. In this case, when a terminal needs to send an uplink data signal, the terminal selects, from time-frequency resource blocks of a terminal group to which the terminal belongs, one or more time-frequency resource blocks that meet a transmission requirement of the terminal, to perform uplink grant-free transmission.

Configuration information is configured for each time-frequency resource block. Therefore, when the terminal randomly selects a time-frequency resource block, and performs transmission based on configuration information corresponding to the sub-band, a technical effect of coverage enhancement can be also achieved. For example, a terminal 1 belongs to a terminal group 1, and sub-bands that may be selected by the terminal 1 may include a time-frequency resource block 1-1, a time-frequency resource block 1-2, a time-frequency resource block 2, a time-frequency resource block 3, and a time-frequency resource block 4-1 and a time-frequency resource block 4-2. If the terminal 1 selects a time-frequency resource block 4-1 to perform uplink transmission, the terminal 1 selects configuration information corresponding to the time-frequency resource block 4-1 to perform uplink transmission.

Manner 2: The terminal selects a time-frequency resource block for uplink transmission based on a measurement result of channel quality.

In this manner, the terminal may select, based on the measurement result of channel quality, a time-frequency resource block for uplink grant-free transmission more accurately. Therefore, a better coverage enhancement effect can be obtained.

Specifically, the terminal measures channel quality according to formula (1):

$$SNR\_target = P\_ul\ tx - Pathloss - P\_noise \quad (1).$$

Herein, SNR_target represents a target signal-to-noise ratio.

Pathloss represents a path loss, and the path loss can be obtained through measurement. This is a technical means well known to a person skilled in the art. Details are not described herein.

P_noise represents a noise power.

P_ul_tx represents an uplink transmit power, and P_ul_tx is obtained through calculation according to formula (2):

$$P\_ul\_tx = P\_ul\_total - 10*\log(Num\_RB*TTI\ bundlingsize) \quad (2).$$

Herein, P_ul_total represents a total transmit power allowed for uplink transmission.

Therefore, a quantity Num_RB*TTI bundlingsize of RBs required for transmission can be obtained after Pathloss is measured.

$$Num\_RB*TTI\ bundlingsize = 10^{\wedge}(P\_ul\_total - Pathloss - P\_noise)/10 \quad (3).$$

In an implementation, when the time-frequency resource block is a sub-band, a value of TTIbundlingsize is 1.

The terminal may obtain a quantity of time-frequency resource blocks for uplink transmission through calculation according to formula (3), search for configuration information based on the quantity of time-frequency resource blocks, and select a time-frequency resource block corresponding to the configuration information to perform uplink grant-free transmission.

Only a process of selecting a corresponding time-frequency resource block by calculating a quantity of time-frequency resource blocks for uplink transmission is described herein. In the embodiments of this application, parameters such as a power required for uplink transmission, a granularity of a time-frequency resource block, or a TTI bundling size indication or a repetition size indication may be further calculated and then a corresponding time-frequency resource block is selected. A calculation formula for the time-frequency resource block is set as required. Details are not described herein.

Manner 3: The terminal selects a time-frequency resource block for uplink transmission based on a previous statistical result of a success rate of data transmission.

In an implementation, when performing initial transmission, the terminal may randomly select a time-frequency resource block, or select a proper time-frequency resource block based on a value of pathloss to perform uplink transmission.

Then, when the terminal receives a NACK message from the network device N times, the terminal selects a time-frequency resource block with a relatively narrow bandwidth to perform uplink transmission. When receiving an ACK message from the network device, the terminal may select a time-frequency resource block with a relatively wide bandwidth to perform uplink transmission. In this case, the network device may configure a threshold of N, so that the terminal can collect statistics about whether data transmission succeeds.

Manner 4: The terminal selects at least one time-frequency resource block for uplink transmission based on a transmit power required by the terminal.

For example, at a start position of a first RB indicated by 0001, the terminal performs uplink transmission for TTI bundling with a length of bundling size=4 by using a length 1 indicated by 0001, a transmit power of $(½)°$ of a total power indicated by 000, and a length indicated by n4.

After selecting the time-frequency resource block based on any one of the four manners, the terminal performs uplink transmission based on configuration information (for example, a coverage enhancement parameter or a time-frequency resource block parameter) corresponding to the time-frequency resource block. When sending uplink data, cyclic redundancy check (CRC) scrambling is performed by using a terminal ID or an inner group identity number (inner Group ID). A pilot, a reference signal (RS), or a preamble (preamble sequence) used when the network device performs terminal detection is selected from a corresponding terminal group configuration. Pilots may be in a one-to-one correspondence with terminals, to perform terminal identification.

The terminal ID may be a cell radio network temporary identity (C-RNTI), or may be an inner group identity number (inner Group ID). The C-RNTI is configured in an access process or a handover process. The inner group identity number is provided during terminal group resource configuration.

After the terminal performs the uplink transmission, a base station may demodulate new data through detection, that is, process data processing at a previously configured time-frequency resource block position. In this case, a start position or an index number of each possible time-frequency resource block has been preset. Therefore, the base station only needs to make attempts for a small quantity of times. However, in an existing manner, attempts needs to be made at any time-frequency resource block position by using a plurality of possible bandwidths.

To further reduce overheads caused by the detection, the following case may be considered: The terminal may send uplink data and send uplink control signaling that carries a resource selection result simultaneously, and a transmission time-frequency resource block selected by the terminal is notified to the network device, for example, indicating by using identification information of the time-frequency resource block (for example, a start position or an index number of the time-frequency resource block). Further, another parameter configuration, for example, a TTI bundling size, selected by the terminal for transmission on the time-frequency resource block may be reported. To distinguish the control signaling sent by different terminals (that is, associate the control signaling with a terminal), a time-frequency resource for sending the signaling may be pre-agreed with the base station, and the base station is associated with the terminal by using a resource position. Optionally, the terminal ID may be carried in the uplink control signaling. After receiving the signaling, the base station identifies the terminal and time-frequency resource block information used by the terminal, and correspondingly receives the time-frequency resource block information.

The foregoing describes an implementation of performing uplink transmission by the terminal based on the configuration information and a condition that the network device configures the time-frequency resource block to be associated with a terminal group. The following describes an implementation process in which the network device configures corresponding configuration information for each time-frequency resource block based on a condition that the network device configures a sub-band not to be associated with a terminal group.

The following describes an implementation process of the data transmission method in this embodiment of this application from a perspective of different signaling bearer manners in Manner 2 in which the uplink transmission time-frequency resource is divided into time-frequency resource blocks, specifically, the uplink transmission time-frequency resource is divided into a plurality of time-frequency resource blocks, and the time-frequency resource block is not associated with the terminal group.

Information 1 is division information of time-frequency resource blocks of the uplink transmission time-frequency resource used by a plurality of terminals. Identification information in configuration information of the time-frequency resource blocks may be start positions or index numbers of the time-frequency resource blocks in Information 1.

Information 2 indicates a coverage enhancement parameter corresponding to the time-frequency resource block.

Specifically, when dividing the time-frequency resource blocks of the uplink transmission time-frequency resource specific to the plurality of terminal groups, the network device may allocate an index number to each time-frequency resource block. Details are shown in Table 8:

TABLE 8

| Time-frequency resource block | Index number |
| --- | --- |
| Time-frequency resource block 1 | 1 |
| Time-frequency resource block 2 | 2 |
| Time-frequency resource block 3 | 3 |
| Time-frequency resource block 4 | 4 |
| Time-frequency resource block 5 | 5 |
| Time-frequency resource block 6 | 6 |
| Time-frequency resource block 7 | 7 |
| Time-frequency resource block 8 | 8 |

When selecting a time-frequency resource block to perform uplink transmission, the terminal may send, to the network device, an index number of the time-frequency resource block selected by the terminal, so that the network device can perform accurate detection.

If a mapping relationship between the time-frequency resource block and a terminal is added, details are shown in Table 9:

TABLE 9

| Time-frequency resource block | Index number | Terminal to which the time-frequency resource block belongs |
| --- | --- | --- |
| Time-frequency resource block 1 | 1 | 1 |
| Time-frequency resource block 2 | 2 | 2 |
| Time-frequency resource block 3 | 3 | 3 |
| Time-frequency resource block 4 | 4 | 4 |
| Time-frequency resource block 5 | 5 | 5 |
| Time-frequency resource block 6 | 6 | 6 |
| Time-frequency resource block 7 | 7 | 7 |
| Time-frequency resource block 8 | 8 | 8 |

Information 2 including the time-frequency resource block parameter or the coverage enhancement parameter is described in detail below.

Information 2 may be broadcast by the network device at a system level. In other words, the information 2 is sent to the terminal by using a system message, or may be configured by using RRC signaling or a MAC CE after the terminal completes connection setup. It should be understood that, in a manner of carrying information by using RRC signaling, signaling overheads for sending Information 1 and Information 2 are reduced and more flexibility is obtained.

The following describes, from a perspective of different signaling bearer manners, an implementation process of the data transmission method in this embodiment of this application in Manner 2 in which the uplink transmission time-frequency resource is divided into time-frequency resource blocks and is not associated with the terminal group.

It should be understood that the following embodiments describe configuration information of the time-frequency resource blocks and a configuration information carrying manner when the plurality of time-frequency resource blocks obtained by dividing the uplink transmission time-frequency resource are specifically in a form of a plurality of sub-bands. When the time-frequency resource block is further divided into smaller time-frequency resource blocks in a dimension of time domain, corresponding slots or symbol identifiers are added to indication manners such as start positions, a quantity, lengths, and the like of the smaller time-frequency resource blocks.

Embodiment 9: Adding Configuration Information of the Time-Frequency Resource Block to RRC Signaling Embodiment 9 is similar to Embodiment 1. New RRC signaling is defined to carry the configuration information, carried in the RRC signaling; and similar to Embodiment 7, configuration information that includes a TTI bundling size indication or a repetition size indication may be also carried in the RRC signaling. For brevity, details are not described herein.

Embodiment 10: Adding Configuration Information of the Time-Frequency Resource Block to MAC CE Signaling In this embodiment, the network device also needs to define a new MAC CE and a corresponding MAC subheader. A specific message format and a field definition of a time-frequency resource block are also the same as those in Embodiment 2. In addition, in this embodiment, similar to Embodiment 6, configuration information that includes a granularity indication of a time-frequency resource block may be also carried in a MAC CE; and similar to Embodiment 8, configuration information that includes a TTI bundling size indication or a repetition size indication may be also carried in the MAC CE. For brevity, details are not described herein.

Embodiment 11: Adding Configuration Information to a System Message

In this embodiment, a new element also needs to be defined through same definition as the definition of the element used for transmission by using the RRC signaling.

The newly added element may be added to "RadioResourceConfigCommonSIB" defined in an existing LTE protocol, and is transmitted to the terminal by the system message.

A message format of the newly added element is denoted as follows:

```
RadioResourceConfigCommonSIB ::= SEQUENCE {
    rach-ConfigCommon                RACH-ConfigCommon,
    bcch-Config                      BCCH-Config,
    pcch-Config                      PCCH-Config,
    prach-Config                     PRACH-ConfigSIB,
    pdsch-ConfigCommon
PDSCH-ConfigCommon,
    pusch-ConfigCommon
PUSCH-ConfigCommon,
    pucch-ConfigCommon
PUCCH-ConfigCommon,
    soundingRS-UL-ConfigCommon
SoundingRS-UL-ConfigCommon,
    uplinkPowerControlCommon         UplinkPowerControlCommon,
    ul-CyclicPrefixLength            UL-CyclicPrefixLength,
    narrowband-Config-List           NarrowbandConfigList,
    ...,
    [       uplinkPowerControlCommon-v1020 UplinkPowerControlCommon-v1020
OPTIONAL    -- Need OR
    ]
}.
``` and the configuration information is sent to the terminal by using an RRC connection setup message "RRC Connection Setup message" or an RRC connection reconfiguration message "RRC Connection Reconfiguration message."

A message format and a field meaning of the time-frequency resource block are the same as those in Embodiment 1. In addition, in this embodiment, similar to Embodiment 5, configuration information that includes a granularity indication of a time-frequency resource block may be also Similar to Embodiment 4, in this embodiment, the configuration information that includes a granularity indication of a time-frequency resource block may be also carried in the system message.

Embodiment 9 to Embodiment 11 describe, from a perspective of the network device based on Manner 2 in which the uplink transmission time-frequency resource used for grant-free transmission is divided into the plurality of time-frequency resource blocks (not associated with the terminal group), an implementation process of carrying the configuration information by using RRC, the MAC CE, the system message, and the DCI. Parameters carried in the configuration information are further divided into a power control parameter, the TTI bundling size indication or repetition size indication, the granularity, the length, and the index number of the time-frequency resource block, the start position or an end position of the time-frequency resource block, and the like.

Similar to the foregoing embodiment in which the sub-band is associated with the terminal group, in this embodiment, when the terminal selects a time-frequency resource block, there are also the following four implementations: 1. Selection is randomly performed. 2. Selection is performed based on a measurement result of channel quality. 3. Selection is performed based on a previous statistical result of a success rate of data transmission. 4. Selection is performed based on a transmit power requirement.

Different from the foregoing embodiment in which the time-frequency resource block is associated with the terminal group, in an implementation in which the time-frequency resource block is not associated with the terminal group, when sending uplink data during uplink grant-free transmission, each terminal needs to add a terminal identifier to the uplink data, for example, carry the terminal identifier by using the MAC CE or the RRC signaling. A pilot, a reference signal (RS), or a preamble (preamble sequence) corresponding to the time-frequency resource block are not allocated to a fixed terminal or terminal group. Consequently, terminals cannot be distinguished. Therefore, it is necessary to indicate a carried terminal ID during data transmission, so that the network device distinguishes a terminal or the terminal group after receiving the data, and further processes or distributes the uplink data. Similarly, an ID corresponding to a time-frequency resource block instead of a terminal ID is used for data scrambling. This sub-band ID is corresponding only to a time-frequency resource block instead of being allocated to a fixed terminal or terminal group. A pilot, a reference signal (RS), or a preamble (preamble sequence) used when the network device performs terminal detection is selected from a corresponding time-frequency resource block configuration. The network device performs CRC processing by using an ID of a time-frequency resource block, and further processes or distributes the uplink data based on the terminal ID in the uplink data.

The ID of the time-frequency resource block may be a cell radio network temporary identity (C-RNTI), or may be a newly defined RNTI that can distinguish a plurality of time-frequency resource blocks in a cell, and the ID of the time-frequency resource block is sent by the network device to the terminal together with the configuration information of the time-frequency resource block.

The terminal ID may be a C-RNTI or a global subscriber identifier, for example, an international mobile subscriber identity (IMSI), or a temporary mobile subscriber identify (TMSI).

It should be understood that, in this embodiment of the present disclosure, only the C-RNTI, the IMSI, and the TMSI are used as examples to describe the terminal ID. However, this application is not limited thereto, and another user identifier may be also used to determine the terminal ID.

Similarly, the ID of the time-frequency resource block or the terminal ID may be carried in signaling such as a system information block (SIB), an RRC, or a MAC CE.

The foregoing embodiments describe the following implementations based on a condition that the network device divides the uplink transmission time-frequency resource used for uplink grant-free transmission into the pluralities of time-frequency resource blocks: a manner in which the network device configures the corresponding configuration information, and a manner in which the terminal selects the time-frequency resource block and performs the uplink grant-free transmission by using the configuration information. In the configuration information, a start position or a length of a sub-band of the time-frequency resource block is represented by using a character. For example, for a field "StartPoint", if a value of the field "StartPoint" is 0001, it represents that a start position of the time-frequency resource block is a first RB; and 0010 represents that a start position of the time-frequency resource block is a second RB, and so on. For a field "Length", if a value of the field "Length" is 0000, it represents a length 1, 0001 represents a length 2, 0010 represents a length 4, and so on.

In another implementation, configuration information corresponding to different sub-bands may be further represented by using a pilot pattern or a pilot sequence. Details are described below. It should be noted that, when a time-frequency resource block is further divided into smaller time-frequency resource blocks in a dimension of time domain, corresponding slots or symbol identifiers are added to indication manners such as start positions, a quantity, lengths, and the like of the smaller time-frequency resource blocks. Details are not described herein.

When transmitting data, the terminal needs to further send a pilot, to perform channel estimation and data demodulation. As a bandwidth changes, in consideration of efficiency and performance, different pilot patterns are defined in the protocol.

Details are as follows.

Figure 7:
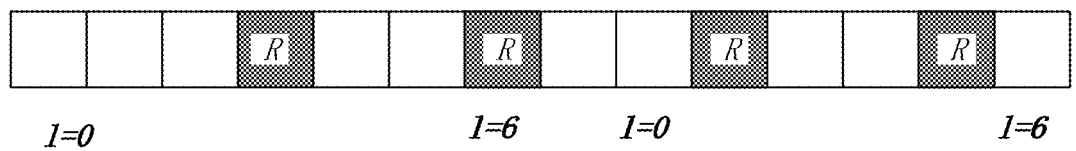
Figure 7:
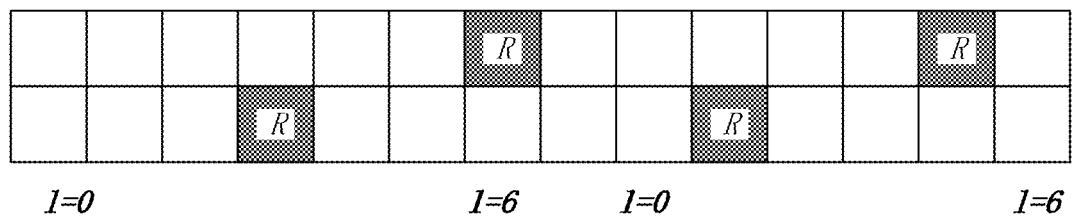
Figure 7:
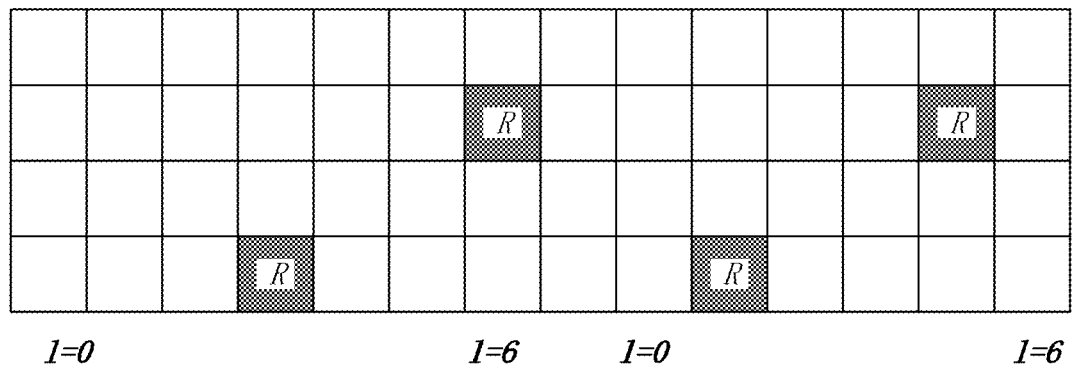

The time-frequency resource block uses a subcarrier as a granularity to define a new pilot pattern. For example, as shown in FIG. 7, a pilot pattern in a case of one subcarrier, a pilot pattern in a case of two subcarriers, and a pilot pattern in a case of four subcarriers. Only examples are provided herein.

When corresponding configuration information is configured for a time-frequency resource block, an index number or a start position of the time-frequency resource block can be obtained only by sequentially indicating a pilot pattern used by each time-frequency resource block. Details are shown in Embodiment 12.

Embodiment 12: Indicating a Start Position of a Time-Frequency Resource Block by Using a Pilot Pattern in RRC Signaling This embodiment is similar to Embodiment 1. A new RRC information element is defined, and is placed, for transmission, in an RRC message–RRCConnectionSetup.

For example, the time-frequency resource block is a sub-band, and a message format of the time-frequency resource block is denoted as follows:

```
--ASN1START
NarrowbandConfigList ::=    SEQUENCE (SIZE(1 to maxNarrowband))
```

```
OF NarrowbandConfig // a sub-band configuration list, including configurations of a plurality of
sub-bands; and determining a quantity of carried sub-bands in the list by using SIZE (1 to
maxNarrowband); and a maximum configuration of the quantity maxNarrowband of sub-bands
and a minimum configuration of one sub-band
      NarrowbandConfig ::=  SEQUENCE {
        ReferenceSignalPattern    ENUMERATED {rsp1, rsp2, rsp4},  // using a pilot
pattern to indicate a start position
    }// a configuration of each sub-band
-- ASN1STOP.
```

Meanings of fields are as follows:

| NarrowbandConfigList field descriptions |
|---|
| ReferenceSignalPattern |
| Herein, rsp1 represents a pilot pattern for a sub-band width of one subcarrier, rsp2 represents a pilot pattern for a sub-band width of two subcarriers, and so on. |

It should be understood that the message format describes an implementation in which the plurality of time-frequency resource blocks obtained by dividing the uplink transmission time-frequency resource are specifically in a form of sub-bands. When the time-frequency resource block is divided into smaller time-frequency resource blocks in a dimension of time domain, corresponding slots or symbol identifiers are added to indication manners such as index numbers, start positions, a quantity, lengths, end positions, and the like of the smaller time-frequency resource blocks.

In addition, in this embodiment, similar to Embodiment 7, configuration information that includes a TTI bundling size indication or a repetition size indication may be also carried in the RRC signaling. For brevity, details are not described herein.

In the embodiment, the configuration information is carried in the RRC signaling. This is used only as an example. Configuration information that includes a pilot pattern may be further carried in a MAC CE, DCI, or a system message.

Figure 8:
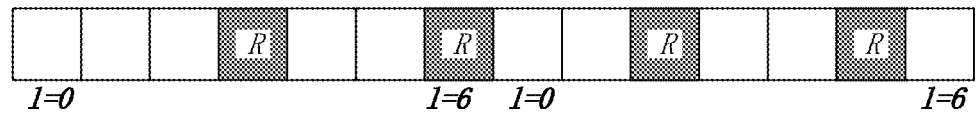
FIG. 8 is a schematic diagram of indicating a granularity of an uplink transmission sub-band by using a pilot pattern according to an embodiment of this application.
Figure 8:
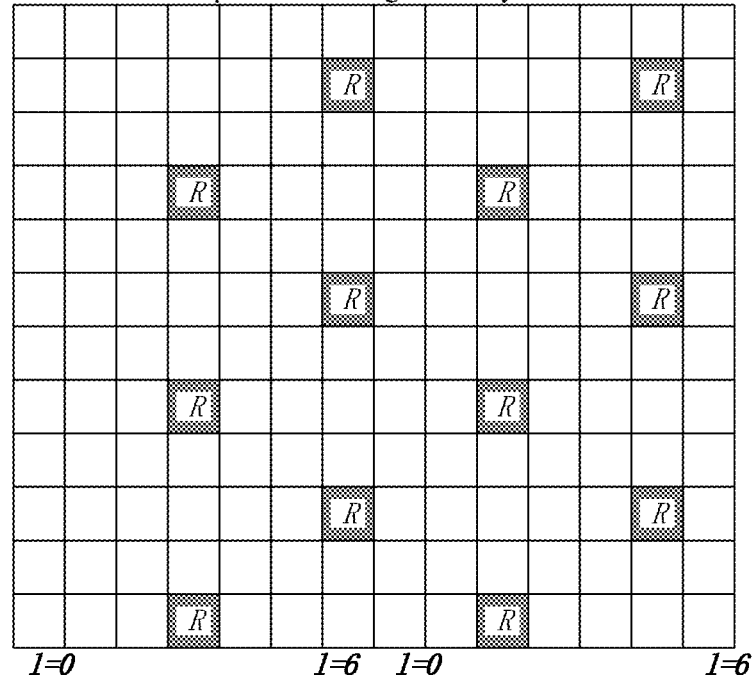
Figure 8:
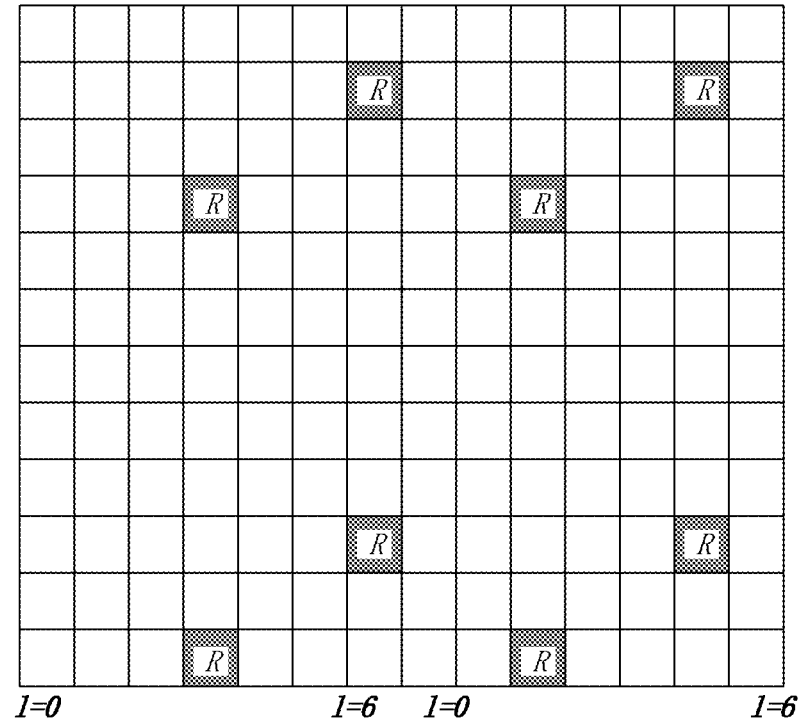

In this embodiment of this application, a new pilot pattern may be further defined to indicate a granularity (Width) of a time-frequency resource block, where the granularity may be a subcarrier, an RB, or an RBG. FIG. 8 shows pilot patterns when granularities of sub-bands are a subcarrier, an RB, and an RBG (including three RBs). This is used only as an example herein.

When corresponding configuration information is configured for a time-frequency resource block, a granularity of a sub-band can be obtained only by sequentially indicating pilot patterns. Details are shown in Embodiment 13.

Embodiment 13: Indicating a Granularity of a Time-Frequency Resource Block by Using a Pilot Pattern in RRC Signaling This embodiment is similar to Embodiment 1. In this embodiment, a new RRC information element is defined, and is placed, for transmission, in an RRC message RRC-ConnectionSetup.

For example, the time-frequency resource block is a sub-band, and a message format of the time-frequency resource block is denoted as follows:

```
-- ASN1START
    NarrowbandConfigList ::= SEQUENCE (SIZE(1 to maxNarrowband)) OF
NarrowbandConfig // a sub-band configuration list, including configurations of a plurality of
sub-bands; and determining a quantity of carried sub-bands in the list by using SIZE (1..
maxNarrowband); and a maximum configuration of the quantity maxNarrowband of sub-bands
and a minimum configuration of one sub-band
      NarrowbandConfig ::=  SEQUENCE {
        ReferenceSignalPattern    ENUMERATED {rsp1, rsp2, rsp4},  // using a pilot
pattern to indicate a granularity of a sub-band
    }// a configuration of each sub-band
-- ASN1STOP.
```

Meanings of fields are as follows:

| NarrowbandConfigList field descriptions |
|---|
| ReferenceSignalPattern |
| Herein, rsp1 represents a pilot pattern when a granularity of a sub-band is a subcarrier, rsp2 represents a pilot pattern when a granularity of a sub-band is an RB, and so on. |

In addition, in this embodiment, similar to Embodiment 7, configuration information that includes a TTI bundling size indication or a repetition size indication may be also carried in the RRC signaling. For brevity, details are not described herein.

An index number, a start position, and an end position of a sub-band, a quantity of sub-bands, and a granularity of a time-frequency resource block may be indicated by using the pilot pattern. In addition, representation of another field is similar to that in Embodiment 1 to Embodiment 12. For brevity, details are not described herein.

In another implementation, start positions or a quantity of time-frequency resource blocks may be further indicated by using a pilot sequence. The following shows an example.

$$X_q(n) = e^{-j\frac{\pi q n(n+1)}{N_{ZC}^{RS}}}, 0 \le n \le N_{ZC}^{RS} - 1.$$

Herein, $N_{ZC}^{RS}$ represents a length of a ZC sequence, n represents a sequence element number, and q represents a root of the Zadoff-Chu (ZC) sequence. Different roots are corresponding to different ZC sequences. The network device determines a start position of a corresponding time-frequency resource block or a quantity of corresponding time-frequency resource blocks by detecting a specific sequence sent by the terminal.

When the network device indicates the configuration information of the time-frequency resource block by using the pilot pattern or the pilot sequence, upon receiving the configuration information that carries the pilot pattern or the pilot sequence on a terminal side, a corresponding time-frequency resource block for transmission is selected. A selection manner is similar to that in the foregoing embodiment. There are the following four implementations: 1. Selection is randomly performed. 2. Selection is performed based on a measurement result of channel quality. 3. Selection is performed based on a previous statistical result of a success rate of data transmission. 4. Selection is performed based on a transmit power requirement. For brevity, details are not described herein.

It should be understood that the pilot sequence being the Zadoff-Chu (ZC) sequence is only an example. For another example, the pilot sequence may be further an activity detection reference signal (ADRS), a pseudo-noise (PN) sequence, an maximal length sequence of a linear feedback shift register (M sequence), Walsh code, or the like. However, this embodiment of the present disclosure is not limited thereto.

It should be further understood that in this embodiment of the present disclosure, if the pilot sequence is the Zadoff-Chu sequence, terminals mapped to a same sub-band may be distinguished by using cyclic shift values and root numbers. If the pilot sequence is the M sequence, terminals mapped to a same sub-band may be distinguished by using cyclic shift values. In other words, pilot sequences of the terminals mapped to the same sub-band are corresponding to different cyclic shift values.

With reference to FIG. 1 to FIG. 8, the foregoing describes, from a perspective of a method implementation, an uplink transmission technology provided in the embodiments of this application. It should be understood that the operations shown in the methods in the embodiments are only examples, and other operations or variations of the operations may be also performed. In addition, during an implementation, the operations may be further performed in a sequence different from that described in the embodiments of this application, and it is possible that not all the operations shown in the embodiments of this application need to be performed. Alternatively, more operations than those shown in the embodiments of this application may be performed.

It should be further understood that in various embodiments of this application, sequence numbers of the foregoing processes do not mean execution sequences. The execution sequences of the processes should be determined based on functions and internal logic of the processes, and shall not constitute any limitation on the implementation processes of the embodiments of this application.

With reference to FIG. 9, the following describes, from perspectives of the network device and the terminal, an uplink transmission apparatus provided in an embodiment of this application.

Referring to FIG. 9, a terminal 500 provided in this embodiment of this application includes at least a processor 504 and a transceiver 508.

The terminal may further include a memory 519, and the memory 519 stores a computer-executable instruction.

The processor 504 is configured to obtain a time-frequency resource used to transmit uplink data, where the time-frequency resource is at least one time-frequency resource block selected from a plurality of time-frequency resource blocks, each of the time-frequency resource blocks is corresponding to one piece of configuration information, and the configuration information includes at least identification information of the corresponding time-frequency resource block. The transceiver 508 is configured to transmit, based on the configuration information of the at least one time-frequency resource block selected by the processor 504, transmit the uplink data on the at least one selected time-frequency resource block.

The processor 504 may be configured to perform an action implemented by the terminal in the foregoing method embodiments, and the transceiver 508 may be configured to perform a transmitting action or a sending action by the terminal to the network device in the foregoing method embodiments. For details, refer to the descriptions in the foregoing method embodiments. Details are not described herein.

The processor 504 and the memory 519 may be integrated into one processing apparatus. The processor 504 is configured to execute program code stored in the memory 519 to implement the foregoing functions. In an implementation, the memory 519 may be alternatively integrated into the processor 504.

The terminal may further include a power supply 512, and the power supply 512 is configured to supply power to various components or circuits of the terminal. The terminal may include an antenna 510, and the antenna 510 is configured to send, by using a radio signal, uplink data or uplink control signaling output by the transceiver 508.

In addition, to further improve a function of the terminal, the terminal may further include one or more of an input unit 514, a display unit 516, an audio circuit 518, a camera 520, a sensor 522, or the like. The audio circuit may further include a loudspeaker 5182, a microphone 5184, and the like.

Figure 10:
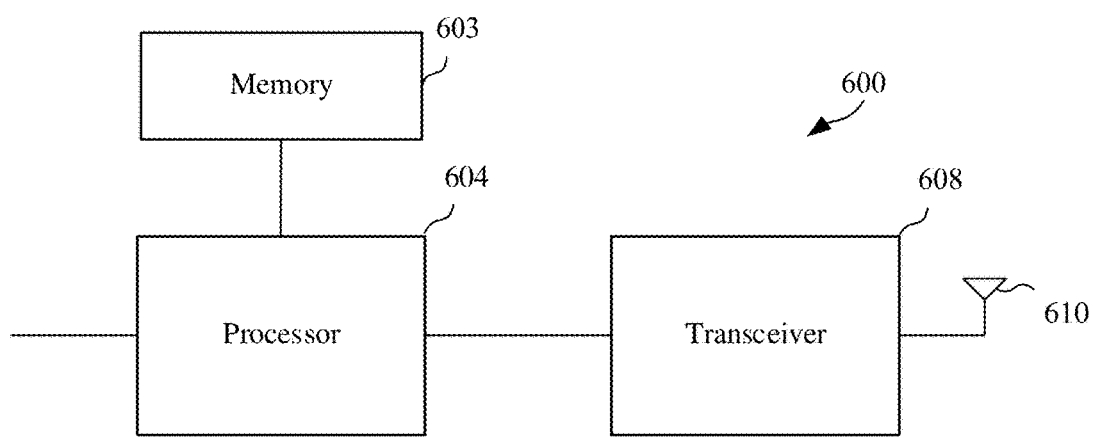
FIG. 10 is a schematic structural diagram of a network device according to an embodiment of this application.

Referring to FIG. 10, a network device provided in an embodiment of this application includes at least a processor 604 and a transceiver 608.

During an implementation, the network device may further include a memory 603, and the memory 603 is configured to store information about a time-frequency resource used to transmit uplink data. The time-frequency resource includes a plurality of time-frequency resource blocks.

The transceiver 608 of the network device is configured to send, to a terminal, the information about the time-frequency resource used to transmit the uplink data, where the time-frequency resource includes the plurality of time-frequency resource blocks; the information about the time-frequency resource includes each time-frequency resource block and configuration information corresponding to the time-frequency resource block; and the configuration information includes at least identification information of the corresponding time-frequency resource block.

The processor 604 is configured to detect, on at least one time-frequency resource block selected by the terminal, the uplink data transmitted by the terminal.

The processor 604 and the memory 603 may be integrated into one processing apparatus. The processor 604 is configured to execute program code stored in the memory 603 to implement the foregoing functions. In an implementation, the memory 603 may be alternatively integrated into the processor 604. Optionally, the processor 604 of the network device is further configured to divide an uplink transmission time-frequency resource into a plurality of time-frequency resource blocks. Corresponding configuration information is configured for each of the time-frequency resource blocks. The memory 603 is configured to store the uplink transmission time-frequency resource divided by the processor 604 into the plurality of time-frequency resource blocks. Corresponding configuration information is configured for each of the time-frequency resource blocks. The uplink transmission time-frequency resource divided into the plurality of time-frequency resource blocks and the corresponding configuration information may be prestored in the memory 603 in a form of table by a person responsible for system configuration, or may be stored in the memory 603 after the processor 604 divides the uplink transmission time-frequency resource into the time-frequency resource blocks and configures the corresponding configuration information.

When the terminal needs to send the uplink data, the transceiver 608 of the network device sends, to the terminal, the plurality of time-frequency resource blocks and the corresponding configuration information.

The transceiver 608 of the network device is further configured to receive the uplink data sent by the terminal to the network device based on the corresponding configuration information on the time-frequency resource block selected by the terminal.

The network device may further include an antenna 610, and the antenna 610 is configured to send, by using a radio signal, downlink data or downlink control signaling output by the transceiver 608.

It should be noted that the processor 504 of the terminal and the processor 604 of the network device may be central processing units (CPU), network processors (NP), or a combination of the CPUs and the NPs. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 519 of the terminal and the memory 603 of the network device may include a volatile memory, such as a random access memory (RAM), or may include a nonvolatile memory, such as a flash memory, a hard disk drive (HDD), or a solid-state drive (SSD). Alternatively, the memory may include a combination of the foregoing types of memories.

In this embodiment of this application, the terminal may perform wireless communication with the network device through the foregoing grant-free transmission. In addition, the terminal may alternatively perform wireless communication through grant-based spectrum resource transmission.

The network device in the apparatus embodiment of this application may be corresponding to the network device in the method Embodiment 1 to the method Embodiment 12 in this application, and the terminal may be corresponding to the terminal in the method Embodiment 1 to the method Embodiment 12 in this application. In addition, the foregoing and other operations and/or functions of the modules of the network device and the terminal are used to implement corresponding procedures in Embodiment 1 to Embodiment 12. For brevity, the descriptions of the method embodiments of this application are applicable to the apparatus embodiments. Details are not described herein.

During implementation of the network device and the terminal provided in this application, the uplink transmission time-frequency resource pre-allocated by the network device to the terminal is divided into a plurality of uplink transmission time-frequency resources in a form of time-frequency resource blocks. Therefore, the terminal may select a time-frequency resource with a relatively narrow bandwidth to perform uplink transmission, thereby increasing a transmit power of the terminal. Further, the network device further configures the configuration information for each time-frequency resource block. The configuration information may carry the time-frequency resource block parameter or the coverage enhancement parameter, or both parameters. Therefore, after selecting the time-frequency resource block used for uplink transmission, the terminal performs the uplink transmission based on the corresponding configuration information, to further increase a transmit power. In addition, the network device may perform demodulation on a correct time-frequency resource block based on the configuration information, to improve demodulation efficiency and avoid generating a processing latency.

A person of ordinary skill in the art may be aware that, in combination with the examples described in the embodiments disclosed in this specification, units and algorithm operations may be implemented by electronic hardware or a combination of computer software and electronic hardware. Whether these functions are executed in hardware or software mode depends on specific applications and design constraints of the technical solutions. A person skilled in the art may use different methods to implement the described functions for each particular application, but it should not be considered that such implementation goes beyond the scope of this application.

It may be clearly understood by a person skilled in the art that, for convenience and brevity of description, for a working process of the foregoing system, apparatus, and unit, refer to a corresponding process in the foregoing method embodiments. Details are not described herein.

In the several embodiments provided in this application, it should be understood that the disclosed system, apparatus, and method may be implemented in another manner. For example, the described apparatus embodiment is only an example. For example, the unit division is only logical function division and may be other division in actual implementation. For example, a plurality of units or components may be combined or integrated into another system, or some features may be ignored or may not be performed. In addition, the indicated or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the operations of the methods described in the embodiments of this application. The storage medium includes various media that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the method comprises:
   obtaining, by a terminal, a time-frequency resource used to transmit uplink data, wherein the time-frequency resource is at least one time-frequency resource block selected from a plurality of time-frequency resource blocks, each of the plurality of time-frequency resource blocks is corresponding to one piece of configuration information, and the configuration information comprises at least identification information of the corresponding time-frequency resource block used to transmit uplink data;
   selecting the at least one time-frequency resource block from the plurality of time-frequency resource blocks based on a previous corresponding statistical success rate of transmission; and
   transmitting, by the terminal, the uplink data on the at least one selected time-frequency resource block based on configuration information of the at least one selected time-frequency resource block, wherein the identification information is a start position or an index number of the corresponding time-frequency resource block or the identification information corresponds to one or more groups of terminals or one or more sub-bands, wherein each of the plurality of time-frequency resource blocks occupies a same bandwidth, or at least two of the plurality of time-frequency resource blocks occupy different bandwidths.

2. The data transmission method according to claim 1, wherein each of the plurality of time-frequency resource blocks occupies a same quantity of symbols in time domain, or at least two time-frequency resource blocks occupy different quantities of symbols in time domain.

3. The data transmission method according to claim 1, wherein that the terminal selects the at least one time-frequency resource block from the plurality of time-frequency resource blocks comprises:
   randomly selecting, by the terminal, the at least one time-frequency resource block from the plurality of time-frequency resource blocks;
   selecting, by the terminal, the at least one time-frequency resource block from the plurality of time-frequency resource blocks based on a measurement result of channel quality; or
   selecting, by the terminal, the at least one time-frequency resource block from the plurality of time-frequency resource blocks based on a power requirement.

4. A terminal, comprising:
   a processor, configured to obtain a time-frequency resource used to transmit uplink data, wherein the time-frequency resource is at least one time-frequency resource block selected from a plurality of time-frequency resource blocks, each of the plurality of time-frequency resource blocks is corresponding to one piece of configuration information, and the configuration information comprises at least identification information of the corresponding time-frequency resource block used to transmit uplink data, and
   select the at least one time-frequency resource block from the plurality of time-frequency resource blocks based on a previous corresponding statistical success rate of transmission; and
   a transceiver, configured to transmit the uplink data on the at least one selected time-frequency resource block based on configuration information of the at least one time-frequency resource block selected by the processor, wherein the identification information is a start position or an index number of the corresponding time-frequency resource block or the identification information corresponds to one or more groups of terminals or one or more sub-bands, wherein each of the plurality of time-frequency resource blocks occupies a same bandwidth, or at least two of the plurality of time-frequency resource blocks occupy different bandwidths.

5. The terminal according to claim 4, wherein each of the plurality of time-frequency resource blocks occupies a same quantity of symbols in time domain, or at least two time-frequency resource blocks occupy different quantities of symbols in time domain.

6. The terminal according to claim 4, wherein the processor is configured to: randomly select the at least one time-frequency resource block from the plurality of time-frequency resource blocks; select the at least one time-frequency resource block from the plurality of time-frequency resource blocks based on a measurement result of channel quality; or select the at least one time-frequency resource block from the plurality of time-frequency resource blocks based on a power requirement.

7. The terminal according to claim 4, wherein when transmitting the uplink data by using the at least one selected time-frequency resource block, the transceiver notifies a network device of the identification information of the at least one selected time-frequency resource block.

8. The terminal according to claim 4, wherein each configuration information further comprises a power control parameter for a corresponding one of the plurality of time-frequency resource blocks, and wherein the power control parameter indicates a power level used to transmit uplink data.

9. The terminal according to claim 4, wherein each configuration information further comprises a transmission time interval bundling size (TTI bundling size) indication or a repetition size indication for a corresponding one of a plurality of time-frequency resource blocks.

10. A chip, comprising at least one processor and an interface, wherein
    the processor is configured to obtain a time-frequency resource used to transmit uplink data, wherein the time-frequency resource comprises a plurality of time-frequency resource blocks, the information about the time-frequency resource comprises configuration information corresponding to each time-frequency resource block, and the configuration information comprises at least identification information of the corresponding time-frequency resource block used to transmit uplink data; and the processor is further configured to: when the uplink data needs to be sent, select at least one time-frequency resource block from the plurality of time-frequency resource blocks based on a previous corresponding statistical success rate of transmission, and provide the at least one selected time-frequency resource block for a transceiver through the interface, wherein the identification information is a start position or an index number of the corresponding time-frequency resource block or the identification information corresponds to one or more groups of terminals or one or more sub-bands, wherein each of the plurality of time-frequency resource blocks occupies a same bandwidth, or at least two of the plurality of time-frequency resource blocks occupy different bandwidths.

11. The chip according to claim 10, wherein each of the plurality of time-frequency resource blocks occupies a same quantity of symbols in time domain, or at least two time-frequency resource blocks occupy different quantities of symbols in time domain.

12. The chip according to claim 10, wherein the processor is configured to: randomly select the at least one time-frequency resource block from the plurality of time-frequency resource blocks; select the at least one time-frequency resource block from the plurality of time-frequency resource blocks based on a measurement result of channel quality; or select the at least one time-frequency resource block from the plurality of time-frequency resource blocks based on a power requirement.

13. The chip according to claim 10, wherein the processor further configured to cause the transceiver to notify a network device of the identification information of the at least one selected time-frequency resource block.

14. The chip according to claim 10, wherein each configuration information further comprises a power control parameter for a corresponding one of the plurality of time-frequency resource blocks, and wherein the power control parameter indicates a power level used to transmit uplink data.

* * * * *